(12) United States Patent
Duffield et al.

(10) Patent No.: US 7,990,982 B2
(45) Date of Patent: Aug. 2, 2011

(54) METHODS AND APPARATUS TO BOUND NETWORK TRAFFIC ESTIMATION ERROR FOR MULTISTAGE MEASUREMENT SAMPLING AND AGGREGATION

(75) Inventors: Nicholas Duffield, Summit, NJ (US); Carsten Lund, Berkeley Heights, NJ (US); Mikkel Thorup, Florence, MA (US); Edith Cohen, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 307 days.

(21) Appl. No.: 12/335,074

(22) Filed: Dec. 15, 2008

(65) Prior Publication Data

US 2010/0150004 A1    Jun. 17, 2010

(51) Int. Cl.
*H04L 12/28* (2006.01)
*H04L 12/56* (2006.01)
(52) U.S. Cl. ................... 370/400; 370/401; 370/408
(58) Field of Classification Search .............. 370/252, 370/253, 400, 401, 408
See application file for complete search history.

(56) References Cited

U.S. PATENT DOCUMENTS

| | | | |
|---|---|---|---|
| 6,829,220 B1 | 12/2004 | Thorup et al. | |
| 6,850,488 B1 | 2/2005 | Wesley et al. | |
| 6,873,600 B1 | 3/2005 | Duffield et al. | |
| 6,944,673 B2 | 9/2005 | Malan et al. | |
| 7,080,136 B2 | 7/2006 | Duffield et al. | |
| 7,299,283 B1 | 11/2007 | Duffield et al. | |
| 7,363,371 B2 | 4/2008 | Kirkby et al. | |
| 7,653,007 B2 * | 1/2010 | Kodialam et al. | 370/253 |
| 7,724,660 B2 * | 5/2010 | Segel | 370/230.1 |
| 7,729,269 B1 * | 6/2010 | Nucci et al. | 370/252 |
| 2003/0130819 A1 * | 7/2003 | Stewart | 702/182 |
| 2007/0016666 A1 | 1/2007 | Duffield et al. | |
| 2009/0161570 A1 * | 6/2009 | Duffield et al. | 370/252 |

OTHER PUBLICATIONS

Alon et al., "Estimating Arbitrary Subset Sums with Few Probes," pp. 317-325, Symposium on Principles of Database Systems, Proceedings of the twenty-fourth ACM SIGMOD-SIGACT-SIGART symposium on Principles of database systems, held in Baltimore, USA, on Jun. 13-15, 2005 (9 pages).
Brauckhoff et al., "Impact of Packet Sampling on Anomaly Detection Metrics," pp. 159-164, Internet Measurement Conference, Proceedings of the 6th ACM SIGCOMM conference on Internet measurement, held in Rio de Janeiro, Brazil, on Oct. 25-27, 2006 (6 pages).
Cisco Systems, Inc., "NetFlow Services and Applications," Copyrighted in 1999 (27 pages).

(Continued)

*Primary Examiner* — Chi H Pham
*Assistant Examiner* — Farah Faroul
(74) *Attorney, Agent, or Firm* — Hanley, Flight & Zimmerman

(57) ABSTRACT

Methods and apparatus to bound network traffic estimation error for multistage measurement sampling and aggregation are disclosed. An example method disclosed herein comprises determining a hierarchical sampling topology representative of multiple data sampling and aggregation stages, the hierarchical sampling topology comprising a plurality of nodes connected by a plurality of edges, each node corresponding to at least one of a data source and a data aggregation operation, and each edge corresponding to a data sampling operation characterized by a generalized sampling threshold, selecting a first generalized sampling threshold from a set of generalized sampling thresholds associated with a respective set of edges originating at a respective set of descendent nodes of a target node undergoing network traffic estimation, and transforming a measured sample of network traffic into a confidence interval for a network traffic estimate associated with the target node using the first generalized sampling threshold and an error parameter.

20 Claims, 13 Drawing Sheets

OTHER PUBLICATIONS

Claffy et al., "Application of Sampling Methodologies to Network Traffic Characterization," pp. 194-203, vol. 23, Issue 4, ACM SIGCOMM Computer Communication Review, Oct. 1993 (10 pages).

Cohen et al., "Sketching Unaggregated Data Streams for Subpopulation-Size Queries," pp. 253-262 Symposium on Principles of Database Systems, Proceedings of the twenty-sixth ACM SIGMOD-SIGACT-SIGART symposium on Principles of database systems, held in Beijing, China, on Jun. 11-14, 2007 (10 pages).

Cohen et al., "Processing Top-k Queries from Samples," Article No. 7, International Conference on Emerging Networking Experiments and Technologies, Proceedings of the 2006 ACM CoNext Conference, held in Lisboa, Portugal, 2006 (30 pages).

Duffield et al., "Trajectory Sampling with Unreliable Reporting," pp. 37-50, vol. 16, Issue 1, IEEE/ACM Transactions on Networking (TON), Feb. 2008 (12 pages).

Duffield et al., "Predicting Resource Usage and Estimation Accuracy in an IP Flow Measurement Collection Infrastructure," pp. 179-191, Internet Measurement Conference, Proceedings of the 3rd ACM SIGCOMM conference on Internet measurement, held in Miami Beach, USA, on Oct. 27-29, 2003 (13 pages).

Duffield et al., "Charging from Sampled Network Usage," pp. 245-256, Internet Measurement Conference, Proceedings of the 1st ACM SIGCOMM Workshop on Internet Measurement, held in San Francisco, USA, 2001 (12 pages).

Duffield et al., "Flow Sampling Under Hard Resource Constraints," pp. 85-96, vol. 32, Issue 1, ACM SIGMETRICS Performance Evaluation Review, Jun. 2004 (13 pages).

Duffield et al., "Estimating Flow Distributions from Sampled Flow Statistics," SIGCOMM'03 held in Karlsruhe, Germany on Aug. 25-29, 2003 (12 pages).

Duffield et al., "Optimal Combination of Sampled Network Measurements," Internet Measurement Conference, Proceedings of the 5th ACM SIGCOMM conference on Internet Measurement, held in Berkeley, USA, 2005 (14 pages).

Duffield et al., "Trajectory Sampling for Direct Traffic Observation," pp. 280-292, vol. 9, Issue 3, IEEE/ACM Transactions on Networking (TON), Jun. 2001 (14 pages).

Estan et al., "Building a Better NetFlow," pp. 245-256, Applications, Technologies, Architectures, and Protocols for Computer Communication, Proceedings of the 2004 conference on Applications, technologies, architectures, and protocols for computer communications, held in Portland, USA, on Aug. 30-Sep. 3, 2004 (12 pages).

Estan et al., "New Directions in Traffic Measurement and Accounting," pp. 323-336, vol. 32, Issue 4, ACM SIGCOMM Computer Communication Review, Proceedings of the 2002 SIGCOMM Conference, held in Pittsburgh, USA, on Aug. 19-23, 2002 (14 pages).

Gibbons et al., "New Sampling-Based Summary Statistics for Improving Approximate Query Answers," pp. 331-342, International Conference on Management of Data, Proceedings of the 1998 ACM SIGMOD international conference on Management of data, held in Seattle, USA, 1998 (12 pages).

Jedwab et al., "Traffic Estimation for the Largest Sources on a Network, using Packet Sampling with Limited Storage," Technical Report HPL-92-3, HP Laboratories, Bristol, retrieved from http://www.hpl.hp.com/techreports/92/HPL-92-35.html, Mar. 1992 (13 pages).

Johnson et al., "Sampling Algorithms in a Stream Operator," pp. 1-12, International Conference on Management of Data, Proceedings of the 2005 ACM SIGMOD international conference on Management of data, held in Baltimore, USA, 2005 (12 pages).

Keys et al., "A Robust System for Accurate Real-Time Summaries of Internet Traffic," pp. 85-96, vol. 33, Issue 1, ACM SIGMETRICS Performance Evaluation Review, held in Banff, Canada, on Jun. 6-10, 2005 (12 pages).

Kompella et al., "The Power of Slicing in Internet Flow Measurement," Internet Measurement Conference, Proceedings of the 5th ACM SIGCOMM conference on Internet Measurement, held in Berkeley, USA, 2005 (14 pages).

Mai et al., "Is Sampled Data Sufficient for Anomaly Detection?" pp. 165-176, Internet Measurement Conference, Proceedings of the 6th ACM SIGCOMM conference on Internet measurement, held in Rio de Janeiro, Brazil, on Oct. 25-27, 2006 (12 pages).

Phaal et al., "InMon Corporation's sFlow: A Method for Monitoring Traffic in Switched and Routed Networks," Internet Request for Comments: 3176, Sep. 2001 (31 pages).

Reves et al., "Traffic Monitoring with Packet-Based Sampling for Defense against Security Threats," Proceedings of Passive and Active Measurement Workshop (PAM 2002), held in Fort Collins, USA, on Mar. 25-26, 2002 (9 pages).

Szegedy, Mario, "Near Optimality of the Priority Sampling Procedure," Electronic Colloquium on Computational Complexity Report TR05-001, Apr. 12, 2005 (14 pages).

Szegedy et al., "On the Variance of Subset Sum Estimation," Lecture Notes in Computer Science, 2007 (20 pages).

Turian et al., "Computational Challenges in Parsing by Classification," Workshop on Computationally Hard Problems and Joint Inference in Speech and Language Processing, 2006 (8 pages).

Zseby, Tanja, "Deployment of Sampling Methods for SLA Validation with Non-Intrusive Measurements," Proceedings of Passive and Active Measurement Workshop (PAM 2002), held in Fort Collins, USA, on Mar. 25-26, 2002 (11 pages).

Duffield et al., "Priority Sampling Estimating Arbitrary Subset Sums," Computer Science—Data Structures and Algorithms, submitted on Sep. 9, 2005 (26 pages).

Thorup, Mikkel, "Confidence Intervals for Priority Sampling," pp. 252-263, vol. 34, Issue 1, ACM SIGMETRICS Performance Evaluation Review, Jun. 2006 (12 pages).

Duffield, Nick, "A Framework for Packet Selection and Reporting," retrieved from http://tools.ietf.org/html/draft-ietf-psamp-framework-13, Jun. 27, 2008 (36 pages).

Cohen et al., "Confident Estimation for Multistage Measurement Sampling and Aggregation," In Proceedings of the 2008 ACM SIGMETRICS International Conference on Measurement and Modeling of Computer Systems (SIGMETRICS '08), Jun. 2008 (pre-publication version, 12 pages).

* cited by examiner

METHODS AND APPARATUS TO BOUND NETWORK TRAFFIC ESTIMATION ERROR FOR MULTISTAGE MEASUREMENT SAMPLING AND AGGREGATION

FIELD OF THE DISCLOSURE

This disclosure relates generally to network traffic estimation and, more particularly, to methods and apparatus to bound network traffic estimation error for multistage measurement sampling and aggregation.

BACKGROUND

Network traffic measurement typically involves multiple stages of data sampling and aggregation. Examples of such data sampling and aggregation stages include sampling of network data packets and then aggregating the sampled packets into flow statistics at, for example, a router or other network device. Subsequent stages may involve sampling and aggregation of flow statistics into usage records in a network data repository for reporting, query and archiving. Although unbiased estimates of packet, byte and/or flow statistics can be formed for each sampling and aggregation operation, for many applications knowledge of an overall estimation error is desired. Previous network traffic estimation techniques have been limited mainly to analyzing estimator variance for particular sampling and aggregation methods. However, the use of variance as a measure of estimator error assumes that estimator can be approximated by a Gaussian, or normal, distribution.

DETAILED DESCRIPTION

Figure 1:
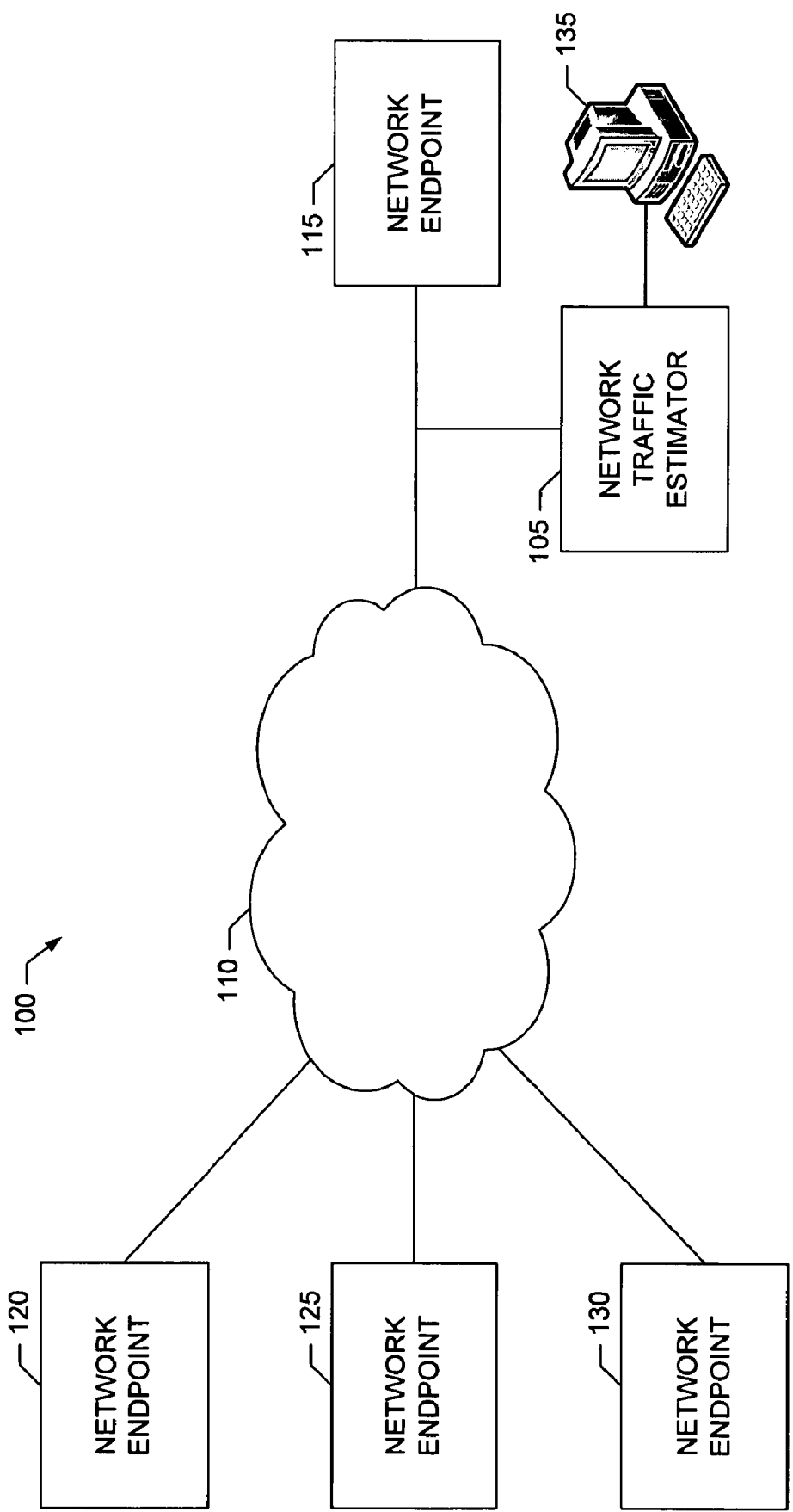
FIG. 1 is block diagram of an example environment of use for an example network traffic estimator implemented according to the methods and/or apparatus described herein.

Methods and apparatus to bound network traffic estimation error for multistage measurement sampling and aggregation are disclosed. An example network traffic estimator described herein operates to determine confidence intervals that bound the error associated with network traffic estimates. In an example operating scenario, a measured sample of network traffic at a particular network location is determined using multiple sampling and aggregation stages. Due to the error introduced by the sampling and aggregation stages, the resulting measurement is also referred to as an estimate of the network traffic rather than a measurement of the actual traffic itself. In such an example, each sampling stage involves performing a sampling operation on measured network traffic data or previously aggregated network traffic data, whereas each aggregation stage involves performing a data aggregation, or combining, operation on the sampled data produced by preceding sampling stage(s). Using such a measured sample of network traffic, the example network traffic estimator determines a network traffic estimate and an associated confidence interval for the determined network traffic estimate.

In an example implementation, a disclosed network traffic estimator operates to determine a hierarchical sampling topology representative of the multiple data sampling and aggregation stages used to obtain the measured (estimated) sample of network traffic at the particular network location. An example hierarchical sampling topology is represented using a tree topology that includes a plurality of tree nodes connected by a plurality of tree edges, with each node corresponding to a data aggregation operation or a source of measured network traffic data, and each edge corresponding to a data sampling operation used to convey data from an origination node to a destination node interconnected by the edge. In such an example, the nodes and edges form a hierarchical sampling topology in which a measured sample of network traffic associated with a target node in the topology is obtained using the sampling and aggregation operations associated with an arrangement of descendent nodes of the target node as interconnected by the corresponding edges in the hierarchical sampling topology.

The example network traffic estimator also operates to determine generalized sampling thresholds to characterize the sampling operation associated with each edge in the hierarchical sampling topology. For a particular sampling operation, a corresponding generalized sampling threshold can be determined that represents how a probability of data sampling is related to a size of the data being sampled. Furthermore, a generalized sampling threshold can be determined for almost any type of sampling operation, even one in which sampling is independent of the size of the data being sampled. In an example implementation, the network traffic estimator determines a generalized sampling threshold for a particular edge based on a sampling probability also used to characterize the sampling operation associated with the edge, as well as the possible data values that may be observed at the origination node connected to the edge. As described below, the sampling probability characterizes how data at the origination node is sampled and provided to the destination node by the sampling operation associated with the edge.

The example network traffic estimator further operates to transform the measured (estimated) sample of network traffic at the particular network into a confidence interval for a network traffic estimate associated with the particular network location. The example network traffic estimator determines the confidence interval using a specified error parameter and a particular generalized sampling threshold selected from the generalized sampling thresholds associated with the edges in the hierarchical sampling topology. In an example implementation, the network traffic estimator selects the particular generalized sampling threshold from a set of generalized sampling thresholds associated with a respective set of edges originating at a respective set of descendent nodes of the target node representative of the particular network location for which network traffic is being estimated. For example, the particular generalized sampling threshold may be selected to be the maximum generalized sampling threshold associated with edges originating at descendent nodes of the target node. Furthermore, as discussed below, selection of the particular generalized sampling threshold may be performed independently of any data aggregation operation associated with any node in the hierarchical sampling topology.

In at least some example implementations, the methods and apparatus to bound network traffic estimation error for multistage measurement sampling and aggregation described herein offer substantial benefits over existing network traffic estimation techniques. As discussed above, prior network traffic estimators have focused on examining estimation error associated with particular sampling methods. In some cases, estimator variances are used to derive confidence intervals based on a Gaussian approximation. For some specific sampling methods, the central limit theorem and resulting Gaussian approximation can be used to characterize the network traffic estimator, especially for sampling method involving large numbers of packets. However, the variance is of limited use for characterizing the error associated with more general sampling methods in which such approximations may not be accurate. Unlike existing network traffic estimation techniques, the methods and apparatus described herein implement a general framework in which to calculate confidence intervals that bound the error associated with a network traffic estimate based on arbitrary combinations of sampling and aggregation operations without assuming an underlying distribution for the resulting network traffic estimate.

Turning to the figures, a block diagram of an example environment of use 100 for an example network traffic estimator 105 implemented according to the methods and/or apparatus described herein is illustrated in FIG. 1. The example environment of use 100 includes a data network 110 configured to interconnect multiple network endpoints 115, 120, 125 and 130. Although the example environment of use 100 depicted in FIG. 1 envisions a data networking application of the example network traffic estimator 105, the example network traffic estimator 105 may be used in any application in which data traffic information is available for analysis.

The example data network 110 included in the example environment of use 100 may be implemented by any type of data networking technology. For example, the data network 110 may be implemented by a local area network (LAN), a wide area network (WAN), a wireless LAN and/or WAN, a cellular network, the Internet, etc., and/or any combination thereof. Additionally, the example network endpoints 115, 120, 125 and 130 may be implemented by any type or combination of network endpoints. For example, some or all of the example network endpoints 115, 120, 125 and 130 could be implemented using individual networkable devices, such as personal computers, workstations, servers, personal digital assistants (PDAs), mobile telephones, smartphones, routers, etc. Additionally or alternatively, some or all of the example network endpoints 115, 120, 125 and 130 could be implemented by multiple networkable devices forming one or more data networks to be interconnected by the example data network 110.

In the illustrated example environment of use 100, the example network traffic estimator 105 samples and/or aggregates network traffic measurements to determine weights representative of the data network traffic carried by the example data network 110. As described in detail below, each data weight has one or more dimensions, with each dimension corresponding to a different measurement of the data network traffic. For example, a first dimensional value of a weight could correspond to an indicator (having, for example, a value of "1") representing an arrival of a packet or a number of packets in a particular data flow measured during a particular measurement interval. In such an example, a second dimensional value of the weight could correspond to a measured size (such as measured instantaneous, average or total numbers of bytes) of the packets during the measurement interval.

In another example implementation, the example network traffic estimator 105 obtains the network traffic measurements (or weights) by querying and/or downloading the network traffic measurements (or weights) from one or more of the example network endpoints 115, 120, 125 and 130. In such an example implementation, one or more of the example network endpoints 115, 120, 125 and 130, such as one or more network routers, may implement one or more sampling stages for making network traffic measurements, whereas the same or other of the example network endpoints 115, 120, 125 and 130 may implement one or more data aggregation stages configured to collect, aggregate and/or store weights determined from sampled network traffic measurements. For example, one or more of the example network endpoints 115, 120, 125 and 130 could make and store the weights determined by multiple stages of sampling and aggregating the measured data network traffic.

Having obtained one or more network traffic measurements (or weights), the example network traffic estimator 105 then transforms the network traffic measurements (or weights) into corresponding confidence intervals for resulting network traffic estimates. In the illustrated example, the network traffic estimator 105 determines a confidence interval for a network traffic estimate formed from a particular network traffic measurement (or weight) by first determining a hierarchical sampling topology representative of the multiple data sampling and aggregation stages used to obtain the particular network traffic measurement (or weight) at a particular target network location (such as the network endpoint 115). In this example implementation, the hierarchical sampling topology includes nodes connected by edges. In such an implementation, each node corresponds to a data aggregation operation or a source of measured network traffic data, and each edge corresponds to a data sampling operation used to convey data from an origination node to a destination node interconnected by the edge.

The network traffic estimator 105 of the illustrated example also determines generalized sampling thresholds to characterize the sampling operation associated with each edge in the hierarchical sampling topology. As mentioned above, generalized sampling threshold for a particular sampling operation represents how a probability of data sampling is related to a size of the data being sampled. Furthermore, generalized sampling thresholds can be determined for most types of sampling operations, even those in which sampling is independent of the size of the data being sampled. Examples of determining these generalized thresholds are discussed in greater detail below. After determining the generalized thresholds, the example network traffic estimator 105 selects a particular generalized sampling threshold from the generalized thresholds associated with edges in the hierarchical sampling topology based on a target node representative of the particular target network location for which the particular network traffic measurement (or weight) was obtained. Selection of the particular generalized sampling threshold is discussed in greater detail below.

Next, the example network traffic estimator 105 uses the selected generalized sampling threshold, as well as a specified error parameter, to transform the particular network traffic measurement (or weight) into a confidence interval that bounds the error associated with a network traffic estimate associated with the particular target network location (such as the network endpoints 115). In an example implementation, the confidence interval is specified as upper and lower limits indicating an error bound on the actual value of network traffic at the particular target location that could yield a network traffic estimate having a value given by the particular network traffic measurement (or weight). Examples of transforming particular network traffic measurements (or weights) into confidence intervals for different sampling and aggregation combinations are discussed in greater detail below.

To configure the example network traffic estimator 105, as well as present the network traffic estimates and confidence intervals determined by the example network traffic estimator 105, the example environment of use 100 further includes an interface terminal 135. The example interface terminal 135 may be implemented by any type of terminal device, such as a personal computer, a workstation, a PDA, a mobile telephone, etc. In the illustrated example, the interface terminal 135 is configured to allow a user to input information describing the hierarchical sampling topology representative of the multiple data sampling and aggregation stages used to obtain the particular network traffic measurement (or weight) at a particular target network location (such as the network endpoint 115). The example interface terminal 135 is also configured to allow a user to select the target node in the hierarchical sampling topology that is representative of the particular target network location, and to input the error parameter for use in confidence interval determination. Additionally, the example interface terminal 135 is configured to display or otherwise present the network traffic estimate and confidence interval determined by the example network traffic estimator 105, as well as any accuracy analyses of the determined confidence interval. Although the example interface terminal 135 is shown as being connected directly to the example network traffic estimator 105 in the illustrated example, the example interface terminal 135 may be connected to the example network traffic estimator 105 through one or more other entities or devices. For example, the interface terminal 135 may be connected with the network traffic estimator 105 via the data network 110.

Figure 2:
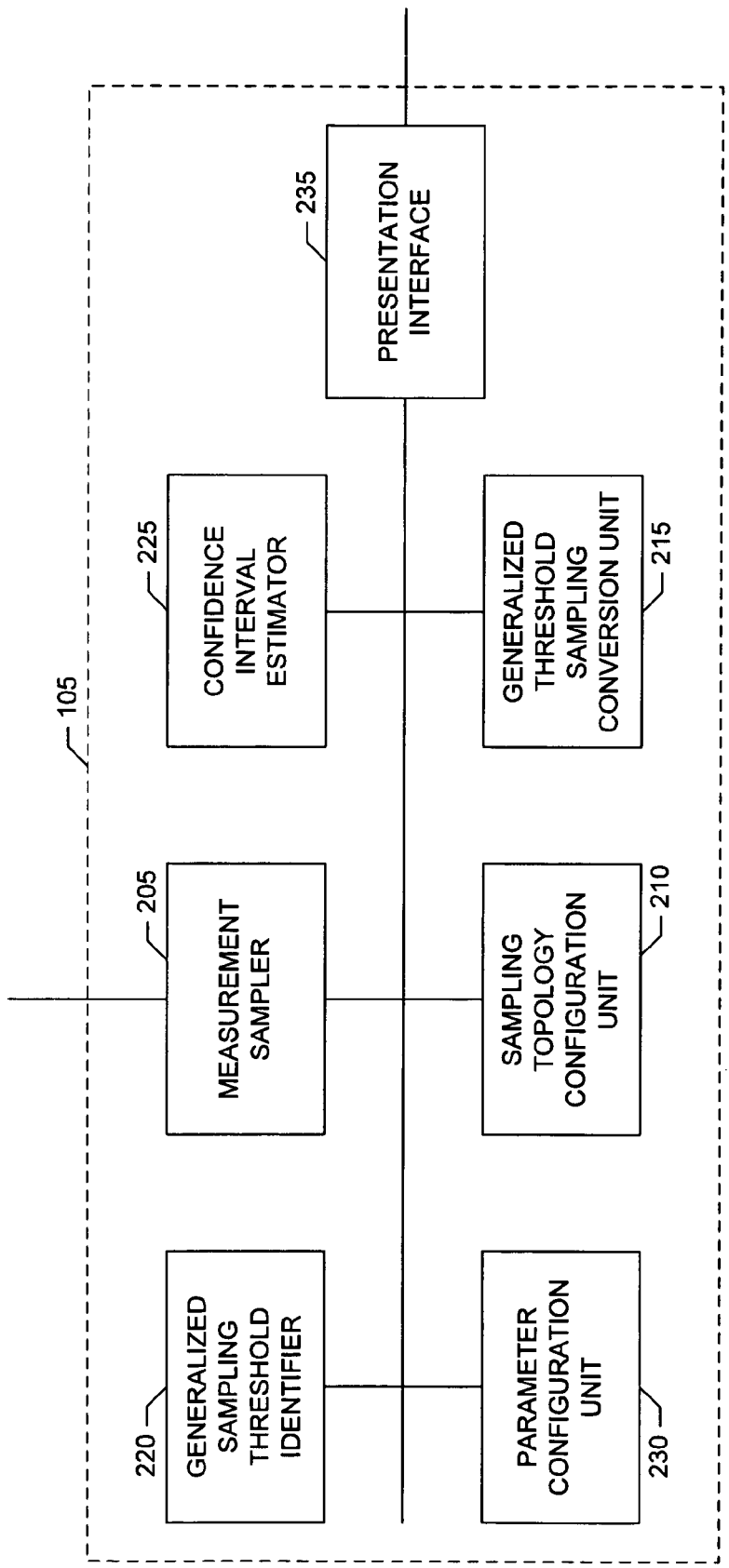
FIG. 2 is a block diagram of an example implementation of the example network traffic estimator of FIG. 1.

An example implementation of the network traffic estimator 105 of FIG. 1 is illustrated in FIG. 2. Before proceeding with a detailed description of FIG. 2, a review of various multistage sampling and aggregation techniques and topologies supported by the example network traffic estimator 105 is provided. Such a review provides a foundation for understanding the implementation and operation of the example network traffic estimator 105 of FIG. 2, as well as its potential benefits and improvements over existing network traffic estimation techniques.

Network traffic measurement typically involves some or all of the following stages: (i) taking traffic measurements at one or more observation points, such as one or more routers and/or special purpose measurement devices; (ii) exporting the traffic measurements from the observation point(s) to one or more collectors for aggregation, possibly via one or more intermediate staging servers; (iii) storing the aggregated measurements in one or more databases that provide reporting and query functions; and (iv) archiving older measurements. For example, a large network service provider may employ thousands of routers and tens of thousands of interfaces. Consequently, the volume of traffic measurements in such networks can potentially be enormous.

Many network management applications, such as traffic engineering, capacity planning and troubleshooting applications, utilize measured traffic usage as input data. The input measured traffic usage may take the form of numbers of packets, bytes and/or the number of flows counted during certain measurement time periods and broken out over subsets of traffic classified according to source, destination, applications class, and/or any other feature or features. For some applications, desired traffic measurement subsets are known prior to the time of measurement, such as for routine reporting of usage by application, customer, etc. However, for other applications, such as troubleshooting or exploratory studies, the traffic subsets of interest are not known before measurement. In these latter applications, the need to aggregate measurements over arbitrary subsets and/or timescales precludes measurement simply using static counters in routers, because extremely large counter values would be required to measure traffic at sufficiently fine granularity to service all possible future queries.

Instead, conventional packet and flow measurement techniques, such as those based on Cisco System's open NetFlow network protocol, currently deployed in production networks employ routers to summarize the individual traffic flows passing through them, with each router exporting a stream of summaries in the form of flow records to a collector. Furthermore, many network service providers employ sampling and/or aggregation during any or all of the network traffic measurement stages described above to reduce the volume of generated measurement data. As an example scenario, network traffic measurement may involve the stages of network packet sampling, aggregation of sampled packets into flow records, and the sampling and aggregation of the resulting flow records on their collection path. (For example, the first two of these stages are commonly accomplished using Cisco's Sampled NetFlow solution.) As another example, stateful packet sampling methods have also been proposed for performing network traffic measurement.

Whenever measurement sampling is employed to perform traffic measurement, only some of the measurements remain and, thus, traffic usage can only be estimated from the sampled measurements. A typical way to produce unbiased estimators of traffic usage is to divide the weight of each contribution to measured traffic usage (such as corresponding to a sampled packet or flow) by the weight's sampling probability. When multiple stages of sampling are employed, information about the actual (or original) traffic is progressively lost. However, for many applications, knowledge of the inherent estimation error for traffic estimates determined from the sampled measurements is desired, if not required. To answer this question for a given estimate X of traffic volume, the example network traffic estimator 105 determines upper and lower confidence levels $X_+$ and $X_-$ that bound the actual underlying traffic volume $\overline{X}$ in the following way. For example, the network traffic estimator 105 operates to determine an upper level (or limit) $X_+$ for which there is only a known small chance that $\overline{X}$ could exceed $X_+$ yet produce the estimate X. Likewise, the network traffic estimator 105 operates to determine a corresponding lower level $X_-$ that $\overline{X}$ will fall below with only some small probability. A particular version of this problem is when the estimate X equals 0. In this case, the upper confidence level $X_+$ represents how likely the actual underlying traffic volume $\overline{X}$ could exceed $X_+$ when no traffic is sampled.

The example network traffic estimator 105 implements a general framework that determines confidence intervals for arbitrary combinations of sampling and aggregation operations. For example, network traffic estimator 105 can determine confidence intervals in the form of upper and lower confidence levels $X_+$ and $X_-$ for various combinations of network packet sampling, aggregation of sampled packets into flow records, sampling of the resulting flow records, and stateful packet sampling. Each of these operations is discussed in greater detail to provide context for the different example operating scenarios discussed below in which the example network traffic estimator 105 is able to provide confidence intervals for resulting network traffic estimates.

In packet sampling operations, packets are sampled by, for example, a router or special purpose measurement device. Generally, packet sampling is performed either periodically according to packet count, such as one packet from every $N^{th}$ packet being sampled, or stratified by groups of packet, such as one packet being sampled at random from each group of N successive packets. Information obtained from sampling a packet includes, or example, an indication that the packet was sampled, a size of the packet, a source and/or destination of the packet, etc. In an example implementation, a report for each sampled packet is exported to a collector. In another example implementation, packet sampling is performed as a precursor to the compilation of flow statistics, which usually cannot be performed at the line rate of router interfaces.

Some network measurement operations also involve aggregating sampled packet information into flow statistics. Flows are sets of packets having a common property, known as a key, that have been observed sequentially at, for example, a router or special purpose measurement device within some measurement interval. Such keys typically correspond to one or more fields from a packet header, such as source and destination Internet protocol (IP) address, transmission control protocol (TCP) and/or user datagram protocol (UDP) port numbers, etc. Flows can be demarked using, for example, (i) periodic time intervals, (ii) timeouts characterized as inactive in which the flow is considered terminated when the time since observing a last packet matching the particular flow's key exceeds an inactive timeout threshold, (iii) timeouts characterized as active in which the flow is considered terminated when the time since observing an initial packet matching the flow's key exceeds an active timeout threshold, and/or any other appropriate flow demarcation criteria. When the flow is determined to have terminated, the router or special purpose measurement device summarizes the flow's aggregate properties in a flow record, which may then be exported for subsequent processing. A typical flow record includes the flow's key, total numbers of packet and/or bytes associated with the flow, observation times for the first and last packets, etc.

Some network measurement operations further involve sampling of flow records for subsequent analysis. A common property of real-world flows is that a small proportion of the flows represent a disproportionately large amount of the packets and bytes making up the total network traffic. For example, file transfer protocol (ftp) applications may cause only a small proportion of the flows in the network but account for a significant amount of the network traffic, whereas domain name service (dns) applications may yield a significant proportion of the flows but account for only a very small amount of the overall network traffic. For this reason, estimates of packet and byte counts derived from uniformly sampled flow records often have poor accuracy and are very sensitive to inclusion or omission of sampled records corresponding to the large flows. Threshold sampling is a known technique that has been used to mitigate the accuracy and sensitivity issues associated with flow sampling. In a typical threshold sampling implementation, flows reporting a size of x are sampled with probability $p_z(x)=\min\{1,x/z\}$, where z is the sampling threshold. The flow size and corresponding threshold z may be specified in terms of numbers of packets, numbers of bytes, etc. As indicated by the sampling probability $p_z(x)$, flows of size at least z are sampled with probability equal to one, whereas smaller flows are sampled with probability proportional to their size x. The form of $p_z(x)$ can be shown to yield an optimal tradeoff between an average number of flows sampled and a variance of the flow size estimator derived from the samples. Priority sampling is a variant of threshold sampling in which exactly some number of flows (k) are selected from a population of all available flow.

Stateful packet sampling is yet another packet sampling and aggregation technique and is designed to maintain some degree of flow state. In typical stateful packet sampling implementations, potential new flow cache entries are sampled and evaluated prior to instantiation. For example, when a new packet arises, if a flow cache entry is currently maintained for its key, the entry is simply updated accordingly (such as by increasing packet and/or byte counts in the flow cache entry corresponding to the particular key). However, if no entry exists, then one is instantiated with some particular probability. In one example implementation, referred to as "counting samples," new flow cache entries are instantiated with probability 1−p. In another example implementation, referred to as "sample-and-hold," new flow cache entries are instantiated with probability $1-r^x$, where x is the packet size and r is a parameter having value less than one. In the latter sample-and-hold implementation, the chance to miss a flow entirely varies based on the packet size associated with the flow and is exponentially small in the number of packets (or bytes). Other example implementations of stateful packet sampling techniques involve dynamic adjustment of sampling probabilities and progressive resampling of aggregates in response to changing network loads and cache utilization.

As an additional note, flow records, possibly after undergoing one or more resampling operations, may be aggregated over longer collection windows (such as minutes or hours) for reporting or archiving.

Turning to FIG. 2, and with the preceding discussion of various multistage sampling and aggregation techniques and topologies in mind, the illustrated example network traffic estimator 105 includes a measurement sampler 205 configured to obtain one or more measured sample of network traffic, such as packet arrivals, at a particular network location, such as the network endpoint 115. In the illustrated example implementation, the measured sample of network traffic obtained by the measurement sampler 205 takes the form of a sample weight determined through one or more sampling and/or aggregation stages. As a result, the sample weight is actually an estimate of the network traffic at the particular network location due to the information lost by the sampling and/or aggregation operations, although the sample weight is based on actual measured traffic.

For example, the one or more measured samples, or weights, obtained by the measurement sampler 205 may be the result of any or all of the sampling and/or aggregation operations described above, such as packet sampling, aggregating sampled packets into flow records, sampling of flow records, stateful packet sampling, etc. In an example implementation, the measurement sampler 205 is configured to perform some or all of the sampling and/or aggregation operations to obtain a resulting measured sample (weight) of network traffic at the particular location. In another example implementation, the measurement sampler 205 is configured to obtain the measured sample (weight) of network traffic from one or more other sources, such as one or more of the example network endpoints 115, 120, 125 and 130, which are responsible for implementing the sampling and/or aggregation operations, and/or storing the resulting measurement samples (weights).

As described above, the example network traffic estimator 105 is configured to then transform the network traffic measurements (or weights) into corresponding confidence intervals for bounding the resulting network traffic estimates. Such confidence intervals are based on the types of sampling and/or aggregations employed, as well as their arrangement in the overall traffic measurement scheme. As such, the example network traffic estimator 105 of FIG. 2 includes a sampling topology configuration unit 210 configured to determine a hierarchical sampling topology representative of the multiple data sampling and aggregation stages used to form the particular network traffic measurement (or weight) obtained by the example measurement sampler 205 for a particular target network location (such as the network endpoint 115). In the illustrated example, the sampling topology configuration unit 210 represents the multistage sampling and aggregation of network measurements by a hierarchical sampling topology taking the form of a stochastic process on a tree.

In such a formulation, and as discussed in greater detail below, the leaf nodes of the tree are associated with weights representative of unsampled data, whereas the other nodes of the tree are associated with weights representative of aggregation operations performed on the sampled weights of respective direct child nodes. Additionally, the edges connecting nodes of the tree represent sampling operations corresponding to the sampling of weights associated with direct child nodes for aggregation at a respective parent node. Furthermore, the root node is associated with a weight representative of a network traffic estimate resulting from the entire multistage sampling and aggregation topology represented by the tree.

Using such a hierarchical sampling topology, it is possible to derive Chernoff bounds for the tail distribution of the estimation error associated with using the weight associated with the root node as an estimate for the actual network traffic corresponding to the network location represented by the root node. The bounds are also called exponential bounds because the tail probability of a given fractional estimation error falls off exponentially in the size of the usage to be estimated. The bounds supply rigorous confidence intervals for the true network traffic aggregated at a particular node (such as if sampling was not employed for data reduction) in terms of the estimated network traffic determined by the sampling and aggregation operations used to form the weight associated with the particular node.

In an example implementation, the hierarchical sampling topology implemented by the sampling topology configuration unit 210 is a generalized threshold sampling tree described by a tuple (V, E, P, X). Here, the components (V, E) represent a tree with a node (or vertex) set V and a set of edges E. The component $P=\{p_k:k \in V\}$ is a set of probability functions associated with a sampling operation originating at node (or vertex) k. The component $X=\{X_k:k \in V\}$ is a vertex-indexed family of weights in [0, ∞) representative of each sampling and aggregation operation as described below.

Figure 3:
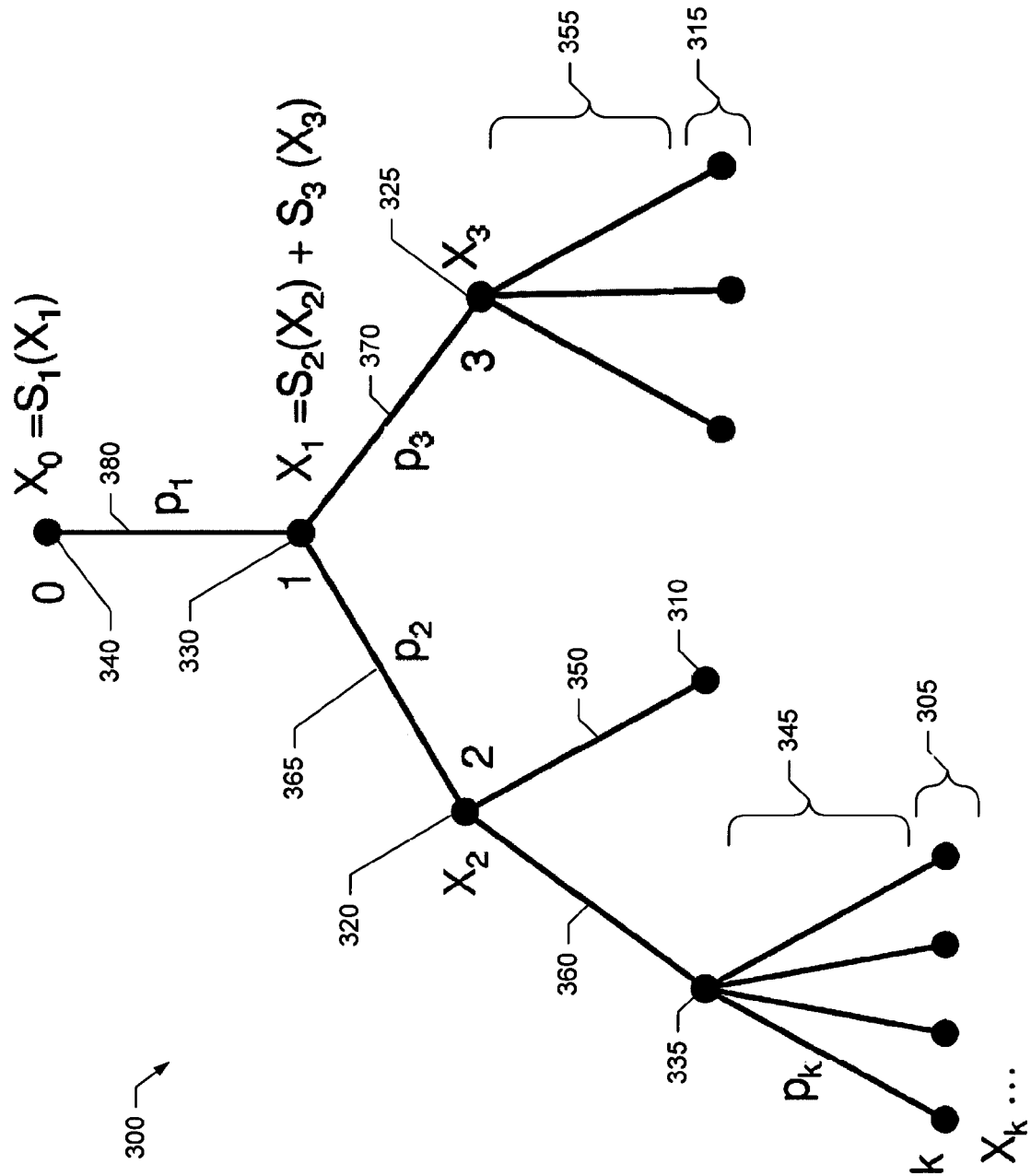
FIG. 3 illustrates an example generic hierarchical sampling topology that may be implemented by the example network traffic estimator of FIGS. 1 and/or 2 to perform network traffic estimation.

In an example generalized threshold sampling tree determined by the sampling topology configuration unit 210, such as the example threshold sampling tree 300 illustrated in FIG. 3, nodes are associated with aggregation operations and edges are associated with sampling operation. As used herein, the symbol c(k) represents a set of child nodes of node k and the symbol $R \subset V$ represents the set of leaf nodes that have no children. For example, in the threshold sampling tree 300 of FIG. 3, the nodes 305, 310 and 315 are the leaf nodes R, whereas the nodes 320 and 325 are the child nodes c(1) of the node 330 (labeled node k=1 in FIG. 3). Additionally, as used herein, the symbol d(k) represents a set of descendant nodes of node k, not including node k itself, whereas the symbol a(k) represents a set of ancestor nodes of node k, not including node k itself. Mathematically, the set of ancestor nodes of node k is given by $a(k)=\{j:k \in d(j)\}$. For example, in the threshold sampling tree 300 of FIG. 3, the nodes 305, 310, 315, 320, 325 and 335 are the descendent nodes d(1) and node 340 is the ancestor node a(1) of the node 330 (labeled node k=1 in FIG. 3). Furthermore, the symbol $R_k$ represents a set of leaf nodes descended through node k. Mathematically, the set of leaf nodes of node k is given by $R_k = R \cap d(k)$. For example, in the threshold sampling tree 300 of FIG. 3, the nodes 305 and 310 are the set of leaf nodes $R_2$ of node 320 (labeled node k=2 in FIG. 3). The root node of the tree denoted by k=0, which corresponds to node 340 in the example threshold sampling tree 300 of FIG. 3.

In the example generalized threshold sampling tree determined by the sampling topology configuration unit 210, as well as the example threshold sampling tree 300 illustrated in FIG. 3, an edge (j, k) with an origination node k is associated with a probability function $p_k$. For example, the threshold sampling tree 300 of FIG. 3 includes the edges 345, 350, 355, 360, 365, 370 and 380. Within this framework, the set of sampling and aggregation process weights X are interpreted as follows. Each leaf node $k \in R$ represents a data source (such as one or more packets in a data flow) having some known weight $X_k \geq 0$. For all other nodes $k \in V \setminus R$, the weight $X_k$ associated with the node represents a data aggregation operation defined through the componentwise sum given by Equation 1, which is $$X_k = \sum_{j \in c(k)} S_{p_j}(X_j). \quad \text{Equation 1}$$

In Equation 1, $S_{p_j}(X_j)$ represents a sampling operation performed on the weight $X_j$ and is described in greater detail below. Thus, for all nodes except the leaf nodes, the weight $X_k$ represents an estimate of the aggregated child weights, with the estimation due to the sampling operation $S_p$.

In the illustrated example, the tree determined by the sampling topology configuration unit 210 is a deterministic object in the sense that its topology is independent of the any sampling and aggregation process performed on $X_k$. Thus, even if $X_k=0$ because none of the weights $X_j$ descending from node k survived sampling, the branch(es) descending from node k are not deleted from the tree.

Each $X_k$ is an unbiased estimator of the total combination of weights at leaves descending from node k. In other words, the weight $X_k$ represents an estimate of the actual total amount of network traffic corresponding to all the data sources (represented as leaf nodes) associated with node k. Mathematically, the actual total weight at node k is given by Equation 2, which is $$\overline{X}_k = \sum_{j \in R_k} X_j. \qquad \text{Equation 2}$$

Thus, $X_k$ is only an estimate of the total weight $\overline{X}_k$ due to the intervening sampling of weights as indicated by the operation $S_{p_j}(X_j)$ in Equation 1. As discussed in greater detail below, the example network traffic estimator 105 operates to determine a confidence interval bounding the difference between $X_k$ and $\overline{X}_k$ for a particular node k representative of the sampling and aggregation operations used to obtain measurement sample (weights) of network traffic at a corresponding particular network location. Without loss of generality, the following description focuses on the statistics of $X_0-\overline{X}_0$, the difference between the estimated (or measured) and actual traffic weights at the rood node of the generalized thresholds sampling tree.

In the preceding description, the hierarchical sampling topology implemented by the sampling topology configuration unit 210 was referred to as a generalized threshold sampling tree. The term "generalized threshold sampling" refers to a novel approach of using a new, generalized form of threshold sampling to represent the sampling operations associated with edges of the tree implemented by the sampling topology configuration unit 210. As developed below, generalized threshold sampling represents a sampling operation as a generalized sampling probability and a corresponding generalized sampling threshold. To determine the generalized sampling probabilities and thresholds corresponding to the sampling operations represented in the hierarchical sampling topology, the example network traffic estimator 105 of FIG. 2 includes a generalized threshold sampling conversion unit 215.

Before describing the example generalized threshold sampling conversion unit 215 of FIG. 2, a description of generalized threshold sampling itself is provided. As its name implies, generalized threshold sampling is a generalization of conventional threshold sampling. As described above, threshold sampling performs independent sampling of flow records, or more generally, items or weights based on a sampling probability that is a function of the sampled item's size. As mentioned above, threshold sampling achieves an optimal trade-off between low sample size and low estimation variance. Generalized threshold sampling is an extension of conventional threshold sampling that can be used to represent a number of different sampling and aggregation schemes, such as those already described above.

More formally, in conventional threshold sampling, a weight x, which is a nonnegative and possibly random variable, is sampled with probability $p_z(x)=\min\{1,x/z\}$, where z is the sampling threshold. The corresponding unbiased estimate of x from its samples is $\hat{x}=(1/p_z(x))x=I\max\{x,z\}$, where I is the indicator function for selection, and is equal to 1 with probability $p_z(x)$ and equal to 0 otherwise. The probability $p_z(x)$ can be shown to minimize the cost function $C_z=E[I]+z^{-2}\text{Var}(\hat{x})$, which is a linear combination of an expected number of samples and a variance estimate. Generally, it is desirable to keep both these factors small, and $p_z(x)$ provides an optimal trade-off between these factors.

Generalized threshold sampling supports more general forms of sampling probabilities other than $p_z(x)$ used for conventional threshold sampling. Furthermore, generalized threshold sampling supports multidimensional sampling, in which the weight x is a multidimensional value that can be written as $x=(x^{(1)}, \ldots, x^{(d)}) \in [0,\infty)^d$, where d is the dimensional order of the weight x. For example, $(x^{(1)},x^{(2)})$ may denote packets and bytes reported in a flow record. Also, in many operating scenarios, it may be assumed that not all possible values of $x \in [0,\infty)^d$ are allowed. For the preceding flow record example, protocol conventions concerning packet sizes impose constraints between $x^{(1)}$ and $x^{(2)}$. Furthermore, in some cases, the sampling properties may be determined entirely by a subset of the $x^{(j)}$, with the remaining dimensional variables acting as auxiliary variables. For example, flow sampling can be performed on the basis of byte values $x^{(2)}$, but the packets $x^{(1)}$ can also be estimated from the multidimensional samples of x. Generally, the set of allowed x is denoted by the symbol $\Omega$.

Using the preceding descriptions of conventional threshold sampling and multidimensional sampling, the generalized threshold sampling framework is developed as follows. First, a generalized sampling probability maps values of a single dimensional or multidimensional weight x to a sampling probability value from zero to one. Mathematically, the generalized sampling probability p(x) implements the mapping $[0,\infty)^d \rightarrow [0,1]$ such that $p(x)=0$ implies $x=0$. Furthermore, denote by $\Omega_p \subset \Omega$ the allowed values of x for which he generalized sampling probability p(x) is strictly less than one, which may be represented mathematically as $\Omega_p=\{x \in \Omega: p(x) <1\}$. Then, each sampling probability p(x) is associated with a single or multidimensional generalized sampling threshold $\tau_p$, which may be represented as a vector of generalized thresholds $\tau_p=(\tau_p^{(1)}, \ldots, \tau_p^{(d)})$, where d is the dimensional order of the threshold $\tau_p$. The generalized sampling threshold $\tau_p$ is a function of the generalized sampling probability p(x) and the allowed values $\Omega_p$ of x for which the sampling probability p(x) is strictly less than one. In particular, the generalized sampling threshold $\tau_p$ is determined from the generalized sampling probability p(x) and the allowed values $\Omega_p$ by Equation 3, which is $$\tau_p^{(i)} = \sup_{x \in \Omega_p} \frac{x^{(i)}}{p(x)}. \qquad \text{Equation 3}$$

In other words, each dimensional value of the generalized sampling threshold $\tau_p$ is determined to be a maximum value of a ratio of possible weight values in the same dimension to corresponding sampling probability values for those possible weight values having sampling probability values strictly less than one. Generalized threshold sampling, therefore, entails sampling the weight x with sampling probability p(x), where p(x) is a probability function for which the dimensional values $\tau_p^{(i)}$ of the threshold $\tau_p$ are all finite (that is, $\tau_p^{(i)} < \infty$).

In the description that follows, it will be useful to also define the dimensional value $\delta_p^{(i)}=\sup\{x^{(i)}: x \in \Omega_p\}$, which is the maximum dimensional value of the weight x in the $i^{th}$ dimension among those values $\Omega_p$ of x for which the sampling probability p(x) is strictly less than one. Clearly, $\tau_p^{(i)} \leq \delta_p^{(i)}$.

Based on this understanding of generalized threshold sampling, the example generalized threshold sampling conversion unit 215 of FIG. 2 operates to determine the generalized sampling probability p(x) and the associated generalized sampling threshold $\tau_p=(\tau_p^{(1)}, \ldots, \tau_p^{(d)})$ for each sampling operation associated with each sampling edge in the generalized threshold sampling tree implemented by the sampling topology configuration unit 210. In an example implementation, the generalized threshold sampling conversion unit 215 is provided the generalized sampling probability p(x) representative of the sampling operation associated with a particular edge of the tree and determines the corresponding generalized sampling threshold $\tau_p$ using Equation 3. In another example implementation, the example generalized threshold sampling conversion unit 215 is provided the generalized sampling probability p(x) and the corresponding generalized sampling threshold $\tau_p$, which have been determined off-line based on knowledge of the multistage sampling and aggregation operations represented by the generalized threshold sampling tree implemented by the sampling topology configuration unit 210. In either example implementation, the generalized threshold sampling conversion unit 215 associates the generalized sampling probability p(x) and the corresponding generalized sampling threshold $\tau_p$ with the appropriate edge in the tree for subsequent use by the example network traffic estimator 105.

For example, in the case of an edge associated with standard threshold sampling, the generalized threshold sampling conversion unit 215 may determine and/or be provided with a generalized sampling probability $p(x)=p_z(x)=\min\{1,x/z\}$ and a corresponding generalized sampling threshold of $\tau_p=\delta_p=z$.

As another example, in the case of an edge associated with uniform sampling with probability N, the weight values will be unbounded because sampling is not performed based on the size of the weight (unlike, for example, conventional threshold sampling in which sampling is based on the size z of the weight being sampled). As such, the generalized sampling threshold for uniform sampling is $\tau_p^{(i)}=\sup_{x>0}x/N=+\infty$, which is unbounded. However, if there is a known upper bound $x_{max}$ on x, then the generalized sampling threshold is $\tau_p^{(i)}=x_{max}/N$. An example of uniform sampling with bounded weights is sampling of IP packets, with x being the packet size and upper bounded by the network maximum transmission unit (MTU). An example of a common upper bound for the MTU is 1500 bytes.

Another example is the case of an edge associated flow slicing. Flow slicing is an extension of threshold sampling that operates with a multifactor aggregate flow descriptor $x=(x^{(1)},x^{(2)},x^{(3)})$ corresponding, respectively, to the aggregate numbers of bytes, packets and flows possessing a TCP SYN flag matching a given key. The sampling probability is $p(x)=\min\{1,\Sigma_{i=1}^3 x^{(i)}/z^{(i)}\}$ for some $z^{(i)}>0$. Thus, the generalized sampling thresholds are $\tau_p^{(i)} \leq z^{(i)}$. Equality is possible if $x^{(j)}=0$ is allowed in the set $\Omega$ of allowed values of x. On the other hand, known constraints between dimensional variables of x can yield tighter constraints the generalized thresholds. For example, suppose the minimum possible packet size, denoted by $M_{min}$ is known, and the MTU, which we denoted by $M_{max}$, is also known. Then, the value of the number of bytes $x^{(1)}$ will lie between $M_{min}$ and $M_{max}$, represented mathematically as $x^{(2)}M_{min} \leq x^{(1)} \leq x^{(2)}M_{max}$. Such a relationship may be used to further bound the upper limits on the generalized sampling thresholds, as discussed in greater detail below.

The generalized sampling threshold $\tau_p$ determined and/or obtained by the generalized threshold sampling conversion unit 215 for each edge of the generalized threshold sampling tree are used by the example network traffic estimator 105 to determine bounds on the uncertainty of the estimators of the weights x undergoing sampling and aggregation. As a preview, let α denote a random variable uniformly distributed on the interval (0, 1]. The sampling operator associated with the generalized sampling probability p(x) is a random function $S_p:[0,\infty)^d \to [0,\infty)^d$ given by Equation 4, which is $$S_p = \frac{x}{p(x)} I(p(x) \geq \alpha). \qquad \text{Equation 4}$$

In Equation 4, I(A) is the common indicator function of the event A, and equals 1 if A is non-zero, and otherwise equals 0. The expression $p(x) \geq \alpha$ represents the event that the weight x is sampled. If x is sampled, and $I(p(x) \geq \alpha)$ is therefore equal to 1, then the estimate of each dimensional component $x^{(i)}$ of the weight x is formed by dividing the sample by the sampling probability p(x). It is elementary that the expected value $E[S_p(x)]=x$, that is, the sampling operator $\hat{x}=S_p(x)$ is an unbiased estimator of the weight x. As such, the sampling operators having of $S_p(x)$ given by Equation 4 are used for the sampling operations referred to in Equation 1 that define the sampling operations performed by edges on the weights associated with respective nodes of the generalized threshold sampling tree.

In the estimation context, the generalized threshold values $\tau_p^{(i)}$ can be interpreted to bound possible values that the estimates $\hat{x}^{(i)}$ formed from the sampling operator $S_p(x)$ can take when the estimates are not equal to the weight value $x^{(i)}$. Thus, as a rough approximation, the generalized threshold values $\tau_p^{(i)}$ are the largest possible uncertain values of the estimates $\hat{x}^{(i)}$. This interpretation can be extended a bit further, as the bounds on the variance of $\hat{x}^{(i)}$ are easy to establish as $Var(\hat{x}^{(i)})=(x^{(i)})^2(p(x)^{-1}-1) \leq \tau_p^{(i)} x^{(i)}$. When $\tau_p^{(i)}$ is unbounded, so is the corresponding variance. Thus the finiteness condition on $\tau_p^{(i)}$ indicates that estimation based on the sampling operator $S_p(x)$ will have bounded variance.

To determine confidence limits on network traffic estimates (or, more generally, weight estimates) corresponding to (i) the measured samples of network traffic (or, more generally, sampled weights) obtained by the example measurement sampler 205, (ii) the hierarchical sampling topology information maintained by the example sampling topology configuration unit 210 and (iii) the generalized threshold sampling information maintained by the example generalized threshold sampling conversion unit 215, the example network traffic estimator 105 further includes a generalized sampling threshold identifier 220 and a confidence interval estimator 225. Although a specific hierarchical sampling topology in the form of a specific tree topology is used to represent the multistage sampling and aggregation of specific sets of packets and/or flows, the following analysis gives bounds which are actually independent of much of the topology. In fact, with reference to FIG. 3 and the discussion of the sampling topology configuration unit 210, the bound on estimation error and the resulting confidence limits depend only on (i) the actual (possibly multidimensional) traffic usage $\overline{X}_0$ under study (corresponding to the root node 340 (k=0) of FIG. 3), (ii) the measured (or, equivalently, estimated) traffic usage $X_0$ (corresponding to the root node 340 (k=0) of FIG. 3), and (iii) a worst-case generalized sampling threshold $\overline{\tau}_p=(\overline{\tau}_p^{(1)}, \ldots, \overline{\tau}_p^{(d)})$. The worst-case generalized sampling threshold $\overline{\tau}_p$ is a function of only the sampling operations used in the tree, and is, hence, presumably known in any given application.

To show this result, first denote the thresholds $\tau_{pk}$ and $\delta_{pk}$ associated with the edge originating at node k in the tree topology as $\tau_k$ and $\delta_k$, respectively, for clarity. The maximum generalized sampling threshold dimensional value $\overline{\tau}_k^{(i)}$ in the set of thresholds $\tau_k$ associated with edges connecting nodes that are descendents of a particular node k is given by Equation 5, which is $$\overline{\tau}_k^{(i)} = \max_{j \in d(k)} \tau_j^{(i)}. \quad \text{Equation 5}$$

Furthermore, define the function $K(\sigma)$ using Equation 6, which is $$K(\sigma) = \frac{e^\sigma}{(1+\sigma)^{1+\sigma}}. \quad \text{Equation 6}$$

$K(\sigma)$ is a ratio of nonlinear, exponential expressions.

Given the measured (estimated) traffic usage $X_0$ at the root node in the tree topology (which is considered an estimate due to the sampling and aggregation operations), it can be shown that the error of this measured traffic usage $X_0$ relative to the actual traffic usage $\overline{X}_0$ is bounded by error bounds that are functions of the maximum generalized sampling threshold dimensional values $\overline{\tau}_0^{(i)}$ associated with the descendents of the root node (or, equivalently, all tree nodes given that k=0) given by Equation 5, as well as the nonlinear, exponential function $K(\sigma)$ given by Equation 6. The values of these error bounds can be determined using Theorem 1 provided below. The proof of Theorem 1 is not critical to implementing and or using the methods and apparatus described herein and, therefore, is deferred to the Appendix included herewith.

Theorem 1: Given a bounding parameter $\sigma>0$, for each dimension $i \in \{1, \ldots, d\}$ for which a measured (estimated) traffic usage weight $X_0^{(i)}$ is available, the error of this measured (estimated) traffic usage weight $X_0^{(i)}$ relative to the actual traffic usage $\overline{X}_0^{(i)}$ in the same dimension i is bounded by Equation 7 and Equation 8, given by $$Pr\{X_0^{(i)} \geq (1+\sigma)\overline{X}_0^{(i)}\} \leq K(\sigma)^{\overline{X}_0^{(i)}/\overline{\tau}_0^{(i)}} \quad \text{Equation 7}$$

$$Pr\{X_0^{(i)} \leq (1-\sigma)\overline{X}_0^{(i)}\} \leq K(-\sigma)^{\overline{X}_0^{(i)}/\overline{\tau}_0^{(i)}} \quad \text{Equation 8}$$

The form of the bounds given by Equation 7 and Equation 8 of Theorem 1 can be interpreted as follows. The probability of the measured (estimated) traffic usage weight $X_0^{(i)}$ experiencing a given fractional error $\sigma$ relative to the actual traffic usage $\overline{X}_0^{(i)}$ falls of exponentially in the size of the actual traffic usage $\overline{X}_0^{(i)}$, with such size specified as a multiple of the maximum generalized threshold value $\overline{\tau}_0^{(i)}$ of all thresholds included in the tree. Thus, actual traffic usage which is large compared with the maximum generalized threshold is easier to estimate accurately than traffic having a smaller size. Also, note that the governing threshold $\overline{\tau}_0^{(i)}$ does not depend on any aggregation operations. Instead, $\overline{\tau}_0^{(i)}$ depends only on knowledge of the sampling operations over all tree nodes.

The bounds in Theorem 1 can be inverted to determine confidence intervals for the actual traffic usage $\overline{X}_0^{(i)}$ based on a particular value $x^{(i)}$ of the measured (estimated) traffic usage weight $X_0^{(i)}$. It can be shown that, given a particular value (or, more generally, outcome) $x=\{x^{(i)}\}$ of the measured (estimated) traffic usage weight $X_0=\{X_0^{(i)}\}$, the confidence interval for the actual traffic usage $\overline{X}_0^{(i)}$ for the $i^{th}$ dimension is bounded by upper and lower limits $X_\pm(\epsilon, x^{(i)}, \overline{\tau}_0^{(i)})$, which are functions of the measure traffic usage x, an error parameter $\epsilon \in (0,1]$ and the maximum generalized threshold $\overline{\tau}_0^{(i)}$ in the tree. In other words, for the $i^{th}$ measurement dimension, the confidence limits on the actual traffic usage $\overline{X}_0^{(i)}$ that could correspond to a particular value $x^{(i)}$ of the measured (estimated) traffic usage weight $X_0^{(i)}$ are given by the interval $X_-^{(i)}(\epsilon, x^{(i)}, \overline{\tau}_0^{(i)}) < x^{(i)} < X_+^{(i)}(\epsilon, x^{(i)}, \overline{\tau}_0^{(i)})$, with a probability of observing (measuring with sampling and aggregation) $x^{(i)}$ with an actual $\overline{X}_0^{(i)}$ greater than $X_+^{(i)}(\epsilon, x^{(i)}, \overline{\tau}_0^{(i)})$ being less than the error probability $\epsilon$, and with the probability of observing $x^{(i)}$ with an actual $\overline{X}_0^{(i)}$ less than $X_-^{(i)}(\epsilon, x^{(i)}, \overline{\tau}_0^{(i)})$ also being less than the error probability $\epsilon$.

Using Equation 7 and Equation 8 of Theorem 1, it can be shown that the upper and lower confidence limits $X_\pm^{(i)}(\epsilon, x^{(i)}, \overline{\tau}_0^{(i)})$ for a particular measurement dimension i are given by Theorem 2 provided below. In the interest of brevity, the proof of the Theorem 2 from Theorem 1 is omitted as it is straightforward and not critical to implementing and or using the methods and apparatus described herein.

Theorem 2: Given an error parameter, or probability, $\epsilon \in (0, 1]$, there exists upper and lower confidence limits $X_\pm^{(i)}(\epsilon, x^{(i)}, \overline{\tau}_0^{(i)})$, given by $$Pr\{\overline{X}_0^{(i)} \geq X_+^{(i)}(\varepsilon, x^{(i)}, \overline{\tau}_0^{(i)})\} \leq \varepsilon \quad \text{Equation 9}$$

and $$Pr\{\overline{X}_0^{(i)} \leq X_-^{(i)}(\varepsilon, x^{(i)}, \overline{\tau}_0^{(i)})\} \leq \varepsilon \quad \text{Equation 10}$$

where $X_-^{(i)}(\epsilon, x^{(i)}, \overline{\tau}_0^{(i)}) < X_+^{(i)}(\epsilon, x^{(i)}, \overline{\tau}_0^{(i)})$ are functions of (i) the particular value $x^{(i)}$ of the measured (estimated) traffic usage weight $X_0^{(i)}$ for the $i^{th}$ dimension, (ii) the error parameter $\epsilon$ and (iii) the maximum generalized threshold $\overline{\tau}_0^{(i)}$ in the tree and, in particular, are the solutions X to the nonlinear, exponential function $$K\left(\frac{x^{(i)}}{X} - 1\right)^{\frac{x^{(i)}}{\tau_0^{(i)}}} = \varepsilon \quad \text{Equation 11}$$

where $K(\sigma)$ is given by Equation 6 above. The roots $X_\pm^{(i)}(\epsilon, x^{(i)}, \overline{\tau}_0^{(i)})$ of Equation 11 can be written more compactly as $$X_\pm^{(i)}(\varepsilon, x^{(i)}, \overline{\tau}_0^{(i)}) = x^{(i)}\Xi_\pm\left(e^{-1}e^{\frac{\tau_0^{(i)}}{x^{(i)}}}\right) \quad \text{Equation 12}$$

where, for $y<1/e$, $\Xi_-(y)<\Xi_+(y)$ are the solutions $\xi$ to the nonlinear, exponential equation $$\xi e^{-\xi} = y. \quad \text{Equation 13}$$

Returning to FIG. 2, and referring to Theorems 1 and 2 for confidence interval as described above, the example generalized sampling threshold identifier 220 and the example confidence interval estimator 225 operate to determine the upper and lower confidence limits $X_\pm^{(i)}(\epsilon, x^{(i)}, \overline{\tau}_0^{(i)})$ of the actual traffic usage $\overline{X}_0^{(i)}$ for the $i^{th}$ measurement dimension as functions of (i) the particular value $x^{(i)}$ of the measured (estimated) traffic usage weight $X_0^{(i)}$ for the $i^{th}$ dimension, (ii) the error parameter $\epsilon$ and (iii) the maximum generalized threshold $\overline{\tau}_0^{(i)}$ in the tree topology. In the illustrated example, the generalized sampling threshold identifier 220 is configured to select a maximum generalized sampling threshold $\overline{\tau}_0^{(i)}$ for a particular measurement dimension i from the set of generalized sampling thresholds associated with the respective set of edges originating at the respective set of descendent nodes of a target node representative of the network location for which network traffic measurements have been obtained (such as the root node 340 of FIG. 3 for which k=0). As described above, the selection of the maximum generalized sampling threshold $\bar{\tau}_0^{(i)}$ depends on only the sampling operations used in the tree and, thus, is performed independently of any data aggregation operation associated with any node in the hierarchical sampling topology. For example, for each measurement dimension i, and for estimation of the actual traffic usage $\bar{X}_0^{(i)}$ associated with the root node, the example generalized sampling threshold identifier 220 selects the maximum generalized sampling threshold $\bar{\tau}_0^{(i)}$ to be the maximum of all sampling threshold $\tau_0^{(i)}$ associated with edges originating the descendent nodes of the root node.

In the illustrated example, the confidence interval estimator 225 then operates to determine the upper and lower confidence limits $X_\pm^{(i)}(\epsilon, x^{(i)}, \bar{\tau}_0^{(i)})$ for the actual traffic usage $\bar{X}_0^{(i)}$ associated the root node for the $i^{th}$ measurement dimension using the maximum generalized sampling threshold $\bar{\tau}_0^{(i)}$ selected by the example generalized sampling threshold identifier 220, a particular value $x^{(i)}$ of the measured (estimated) traffic usage weight $X_0^{(i)}$ for the $i^{th}$ dimension as obtained by the example measurement sampler 205, and an error parameter $\epsilon$ provided, for example, by a parameter configuration unit 230 included in the example network traffic estimator 105. For example, the confidence interval estimator 225 operates to transform the particular measured sample $x^{(i)}$ of the measured (estimated) network traffic usage weight $X_0^{(i)}$ into the confidence interval bounded by the upper and lower confidence limits $X_\pm^{(i)}(\epsilon, x^{(i)}, \bar{\tau}_0^{(i)})$ by determining two roots of an expressions parameterized by the measured sample of network traffic $x^{(i)}$, the first generalized sampling threshold and the error parameter. Examples of such parameterized expression are the nonlinear, exponential equations of Equation 11 and Equation 13.

As described above, uniform sampling requires further consideration in the multistage sampling and aggregation framework described herein. In the illustrated example, the generalized threshold sampling conversion unit 215, the sampling threshold identifier 220 and the confidence interval estimator 225 are suitably configured to support uniform sampling. As described above, weights X associated with the nodes in the tree topology that are connected to edges associated with uniform sampling are sampled with probability p(x)=1/N<1. Because uniform sampling is not based on the size of the weight X (such as a number of bytes, a number of packets, etc.), the associated generalized sampling threshold for uniform sampling is unbounded unless the size of the weight is bounded. However, if there is a known upper bound $X_{max}$ on $X_k$ associated with node k, then the generalized sampling threshold associated with the sampling edge originating from node k is $\tau_p^{(k)} = X_{max}/N_k$, where $1/N_k$ is the sampling probability for the sampling edge originating from node k.

In general, such a bound on the generalized sampling threshold for uniform sampling may not be particularly useful. For example, the maximum possible value of $X_k$, $X_{max}$, may be far larger than the typical value, especially when $X_k$ is associated with a node representing the result of multiple successive sampling and aggregation operations. However at the leaf nodes, the leaf node weights $X_k$ are deterministic, and in this case we have $\tau_p^{(k)} = X_{max}/N_k = X_k/N_k$, because $X_k = X_{max}$ at the leaf nodes. Thus, for sampling of leaf nodes, the example generalized threshold sampling conversion unit 215, the example generalized sampling threshold identifier 220 and the example confidence interval estimator 225 assume generalized sampling thresholds of $\tau_p^{(k)} = X_k/N_k$ in the case of uniform sampling.

As mentioned above, the example network traffic estimator 105 of FIG. 2 also includes an example parameter configuration unit 230 to obtain and provide the error parameter $\epsilon$ to the example confidence interval estimator 225. In the illustrated example, the parameter configuration unit 230 is configured to implement and/or communicate with a user interface, such as a graphical user interface (GUI), accessible via, for example, the interface terminal 135. As such, the example parameter configuration unit 230 can obtain the error parameter $\epsilon$ from a user, a control application, etc. Additionally, the example parameter configuration unit 230 may be used to obtain (from a user, a control application, etc.) any other information needed to configure the multistage sampling and aggregation framework implemented by the example network traffic estimator 105 for performing confidence interval determination.

For example, the parameter configuration unit 230 may be configured to obtain any or all of the hierarchical sampling topology information used by the example sampling topology configuration unit 210, such as information describing the interconnection of nodes and edges in the tree topology, the set of sampling and aggregation process weights X associated with nodes in the tree topology, the sampling operations $S_p$ associated with each edge in the tree topology, the target node representative of the particular network location for which the confidence interval is to be determined (which was assumed to be the root node in the above description, but alternatively could be any node in the sampling tree), etc. Additionally or alternatively, the example parameter configuration unit 230 may be configured to obtain any or all of the generalized threshold sampling information used by the example generalized threshold sampling conversion unit 215, such as the generalized sampling probabilities p(x) to be associated with the sampling operations $S_p$ associated with each edge in the tree topology, the set single or multidimensional generalized sampling threshold $\tau_p$ associated with the generalized sampling probabilities p(x) and, thus, associated with the edge in the tree topology, etc. Furthermore, the example parameter configuration unit 230 may be configured to obtain the maximum generalized sampling threshold dimensional values $\bar{\tau}_0^{(i)}$ in lieu of selection by the example generalized sampling threshold identifier 220.

The example network traffic estimator 105 of FIG. 2 also includes a presentation interface 235 to present results determined by the example network traffic estimator 105. In the illustrated example, the presentation interface 235 is configured to implement and/or communicate with a user interface, such as a graphical user interface (GUI) accessible via, for example, the interface terminal 135. As such, the example presentation interface 235 can present the confidence interval(s) determined by the example network traffic estimator 105. For example, the presentation interface 235 may present upper and lower confidence limits $X_\pm^{(i)}(\epsilon, x^{(i)}, \bar{\tau}_0^{(i)})$ bounding the determined confidence interval, as well as the particular measured sample $x^{(i)}$ of the measured (estimated) network traffic usage weight $X_0^{(i)}$ for which the confidence interval was determined. Additionally or alternatively, the presentation interface 235 may present one or more depictions of the accuracy of the determined confidence interval(s). Example of such accuracy depictions which may be provided by the example presentation interface 235 are illustrated in FIGS. 9-15 and discussed in greater detail below.

While an example manner of implementing the network traffic estimator 105 of FIG. 1 has been illustrated in FIG. 2, one or more of the elements, processes and/or devices illustrated in FIG. 2 may be combined, divided, re-arranged, omitted, eliminated and/or implemented in any other way. Further, the example measurement sampler 205, the example sampling topology configuration unit 210, the example generalized threshold sampling conversion unit 215, the generalized sampling threshold identifier 220, the example confidence interval estimator 225, the example parameter configuration unit 230, the example presentation interface 235 and/or, more generally, the example network traffic estimator 105 of FIG. 2 may be implemented by hardware, software, firmware and/or any combination of hardware, software and/or firmware. Thus, for example, any of the example measurement sampler 205, the example sampling topology configuration unit 210, the example generalized threshold sampling conversion unit 215, the generalized sampling threshold identifier 220, the example confidence interval estimator 225, the example parameter configuration unit 230, the example presentation interface 235 and/or, more generally, the example network traffic estimator 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example network traffic estimator 105, the example measurement sampler 205, the example sampling topology configuration unit 210, the example generalized threshold sampling conversion unit 215, the generalized sampling threshold identifier 220, the example confidence interval estimator 225, the example parameter configuration unit 230 and/or the example presentation interface 235 are hereby expressly defined to include a tangible medium such as a memory, digital versatile disk (DVD), compact disk (CD), etc., storing such software and/or firmware. Further still, the example network traffic estimator 105 of FIG. 2 may include one or more elements, processes and/or devices in addition to, or instead of, those illustrated in FIG. 2, and/or may include more than one of any or all of the illustrated elements, processes and devices.

Figure 4:
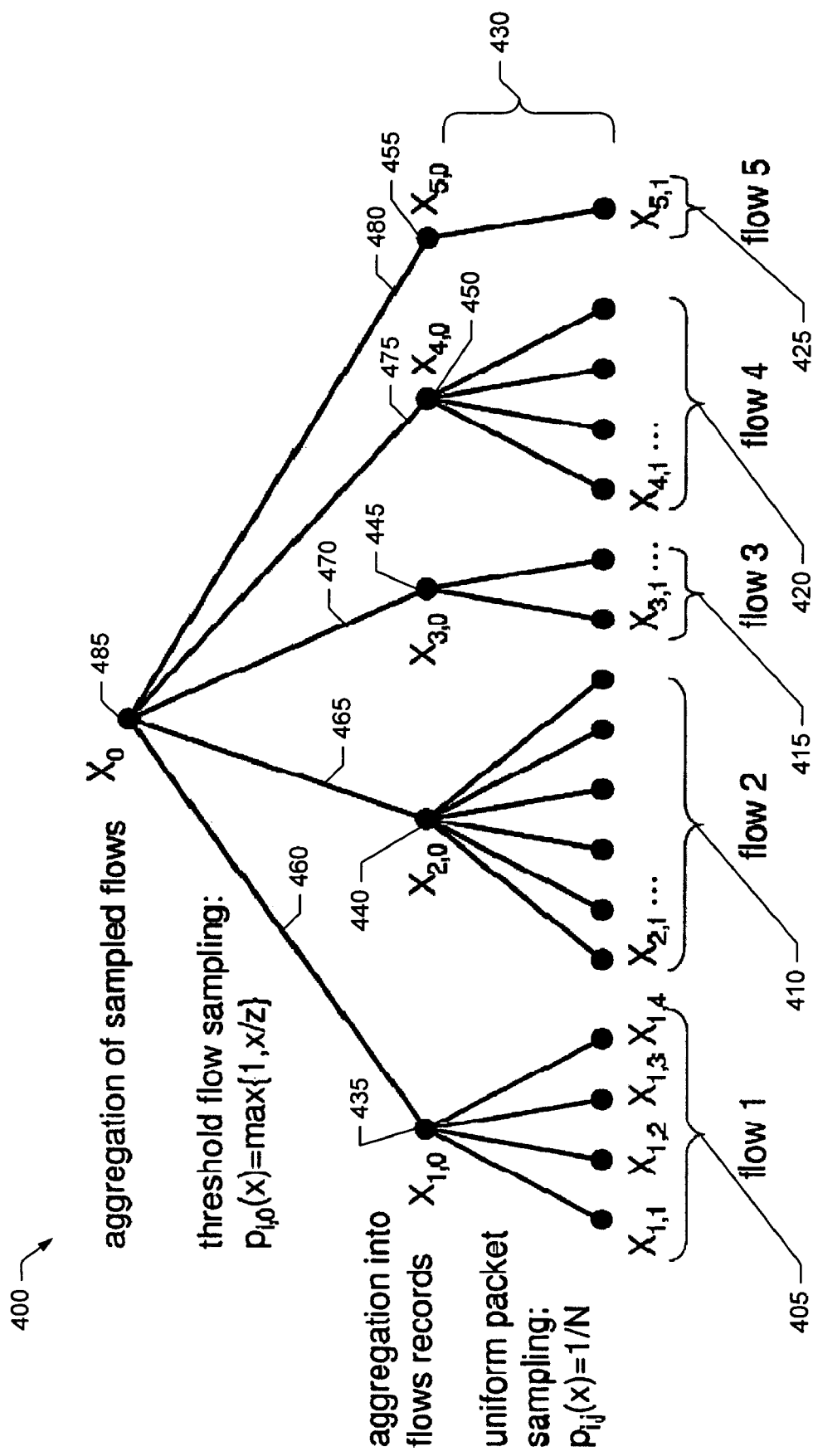
FIG. 4 illustrates an example hierarchical sampling topology corresponding to threshold sampling of packet sampled flow records that may be implemented by the example network traffic estimator of FIGS. 1 and/or 2 to perform network traffic estimation.
Figure 5:
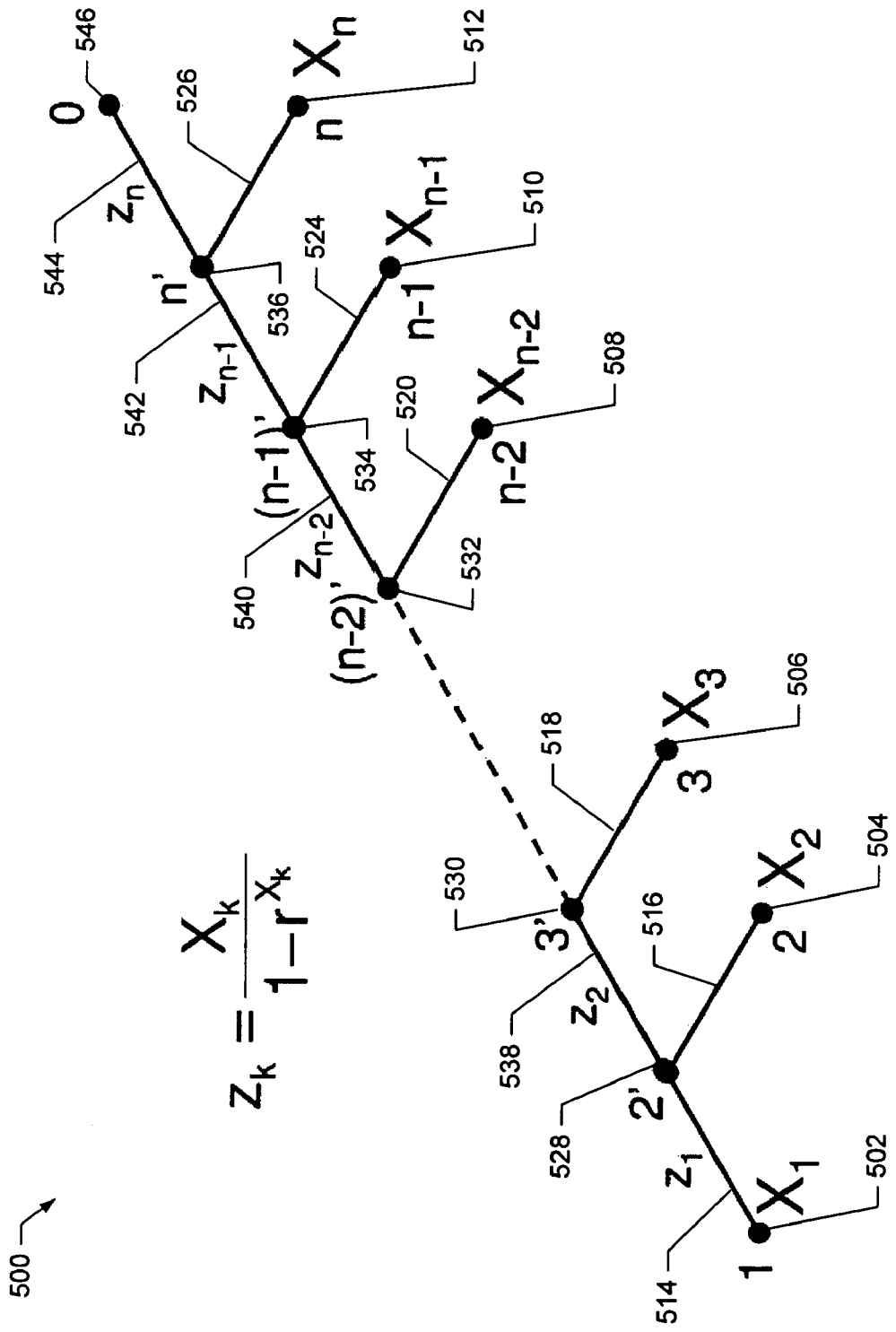
FIG. 5 illustrates an example hierarchical sampling topology corresponding to sample-and-hold sampling of flow records that may be implemented by the example network traffic estimator of FIGS. 1 and/or 2 to perform network traffic estimation.
Figure 6:
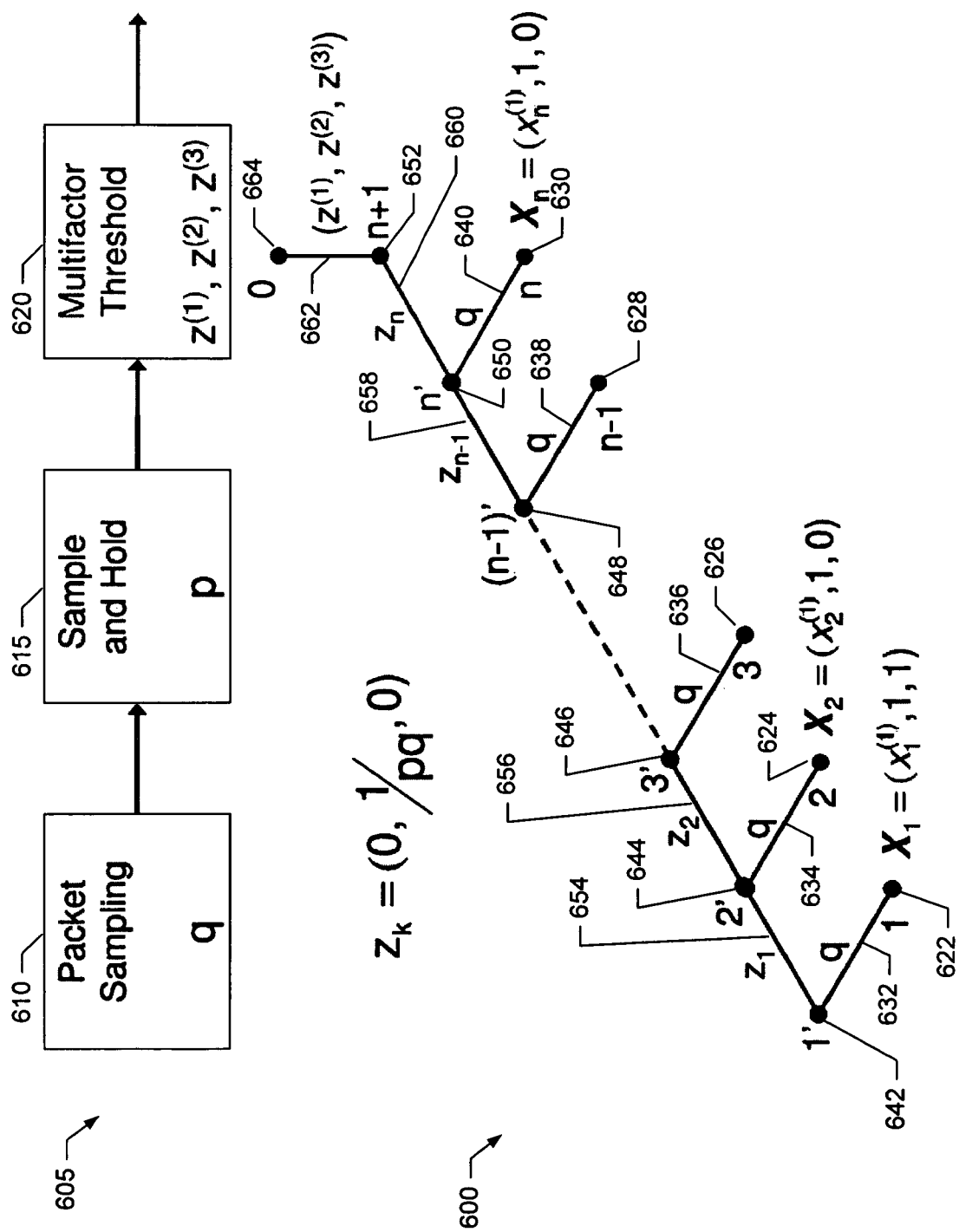
FIG. 6 illustrates an example hierarchical sampling topology corresponding to flow slicing of flow records that may be implemented by the example network traffic estimator of FIGS. 1 and/or 2 to perform network traffic estimation.

Examples of hierarchical sampling topologies representative of real-world multistage sampling and aggregation of network data traffic that can be implemented using the methods and apparatus described herein are depicted in FIGS. 4-6. For example, a hierarchical sampling topology 400 corresponding to threshold sampling of packet sampled flow records that may be implemented by the example network traffic estimator of FIGS. 1 and/or 2 to perform network traffic estimation is illustrated in FIG. 4. The leaf nodes 405, 410, 415, 420 and 425 at the bottom of the example hierarchical sampling topology 400 are data source nodes representative of individual packets grouped into respective flows prior to sampling. As such, the weight $X_{i,j}$ corresponding to leaf node (i, j) represents the byte size of packet j in flow i. Each packet is sampled independently with probability 1/N. These sampling operations are represented by the edges 430 coupling the leaf nodes 405, 410, 415, 420 and 425 to respective intermediate aggregation nodes 435, 440, 445, 450, 455. As mentioned above, packet sampling operations represented by the edges 430 are commonly implemented as periodic or stratified sampling operations. However, the particular implementation of periodic v. stratified sampling is not expected to affect the confidence interval determined using the example hierarchical sampling topology 400.

The packets sampled from each flow are then aggregated into a flow record, with such aggregation represented by the respective intermediate aggregation node (i, 0). Using Equation 1, and with the sampling probability associated with each edge 430 being 1/N, the weight $X_{i,0}$ associated with each aggregation node (i, 0) represents an estimated byte size of $X_{i,0} = \Sigma'_j N X_{i,j}$ where $\Sigma'_j$ indicates that the sum is over the random set of selected packets. Each flow record is then threshold sampled with threshold z, with these threshold sampling operations represented by the respective edges 460, 465, 470, 475 and 480. The results of this sampling are aggregated, with the aggregation represented by node 485, labeled in FIG. 4 as index 0. In network measurement applications, a subset of interesting flow records is usually selected based on a key. Here, the example hierarchical sampling topology 400 represents the processing of packets in a flow matching a given key through multistage sampling and aggregation. Estimation of aggregate traffic over a certain period would involve aggregation over a number of such trees, one per flow. Such aggregation over matching flow records corresponding to a number of duplicated trees is not considered further herein because each such tree would have the same sampling parameters and, thus, the same governing maximum generalized sampling threshold $\bar{\tau}$. This illustrates a benefit of the framework described herein in that it is not necessary to know the specific sampling tree topology in advance. Instead, the relevant tree would depend on the flow keys of interest, and only the maximum generalized sampling threshold needs to be known for sampling operations in the tree.

Using the special consideration of uniform sampling discussed above in connection with FIG. 2, the generalized sampling threshold for each packet sampling operation associated with each respective edge 430 is $NM_{max}$, where $M_{max}$ is the network MTU. Thus the maximum generalized sampling threshold $\bar{\tau}_0$ for use in determine the upper and lower limits for the estimation confidence interval is $$\bar{\tau}_0 = \max\{NM_{max}, z\}. \quad \text{Equation 14}$$

The form of Equation 14 is quite interesting, because it means that the determined confidence interval will be independent of the packet sampling rate provided $NM_{max} < z$. Likewise, the determined confidence interval will be independent of the flow sampling threshold z provided $NM_{max} > Z$.

It is also possible to estimate the number of packets, while extending to the two dimensional weights $(x^{(1)}, x^{(2)})$ representing (bytes, packets), using only the same flow sampling probability $p(x) = p_x(x^{(1)})$. Then, using Equation 3, the generalized sampling threshold $\bar{\tau}^{(2)}$ for packet sampling in the packet dimension is N, whereas for flow sampling in the packet dimension, the generalized sampling threshold is $$\sup_{x^{(1)} < z_p} \frac{x^{(2)}}{p_x(x^{(1)})} = \sup_{x^{(1)} < z_p} \frac{x^{(2)}}{\left(\frac{x^{(1)}}{z}\right)} \leq \frac{z}{M_{min}} \quad \text{Equation 15}$$

where $M_{min}$ is the minimum packet size. Thus the overall threshold for packet number estimation is $$\bar{\tau}_0^{(2)} = \max\{N, z/M_{min}\} \quad \text{Equation 16}$$

An example hierarchical sampling topology 500 corresponding to sample-and-hold sampling of flow records (described above) that may be implemented by the example network traffic estimator of FIGS. 1 and/or 2 to perform network traffic estimation is illustrated in FIG. 5. In the example hierarchical sampling topology 500, each leaf node 502, 504, 506, 508, 510 and 512 corresponds to a data source associated with a weight representing a respective packet of byte size $X_k$. Edges 514, 516, 518, 520, 524, and 526, which are labeled (k',k) in FIG. 5, couple the leaf nodes 502, 504, 506, 508, 510 and 512 to the aggregation nodes 528, 530, 532, 534 and 536 as shown. Each of these edges is associated with a trivial sampling operation having probability one. Edges 538, 540, 542 and 544, which are labeled ((k+1)',k') in FIG. 5, interconnect the aggregation nodes 528, 530, 532, 534 and 536 and a root node 546 as shown. Each of these edges is associated with a threshold sampling operation having threshold $z_k = X_k/p_k$, where $p_k = 1 - r^{X_k}$ represents the probability of sampling packet k. (Here, the value 1−r can be viewed as a per-byte sampling probability).

It can be shown that sample-and-hold sampling estimates the total, actual byte weight $\overline{X}_0 = \Sigma_{k=1}^n X_k$ using an unbiased estimator of $$\hat{X}_0 = \frac{X_{\hat{k}}}{p_{\hat{k}}} + \sum_{i=1+\hat{k}}^n X_i, \quad \text{Equation 17}$$

where $\hat{k}$ is the index of the first selected packet. Theorem 3 below confirms that the example hierarchical sampling topology 500 of FIG. 5 is an accurate representation of sample-and-hold processing with the same estimator $X_0$ associated with the root node 546 equal to $\hat{X}_0$ of Equation 17 in distribution.

Theorem 3: First, it can be shown that $X_m \geq z_m$ for $\hat{k} \leq m \leq n$. Hence $X_0$ and $\hat{X}_0$ have the same distribution. Second, it can be shown that unbiased estimator $X_0$ associated with the root node 546 representing the result of sample-and-hold sampling obeys the bounds of Theorem 1 described above with a maximum generalized sampling threshold $\overline{\tau}_0 = \max_k z_k = \max_k X_k/(1-r^{X_k})$. Thus, the confidence intervals for sample-and-hold sampling can be determined from this maximum generalized sampling threshold using the methods and apparatus described herein.

The first part of Theorem 3 can be proved as follows. As no packet has been sampled before packet $\hat{k}$, $X_{\hat{k}'} = X_{\hat{k}}$. Threshold sampling with threshold $z_{\hat{k}} = X_{\hat{k}}/p_{\hat{k}} > X_{\hat{k}}$ yields $\max\{z_{\hat{k}}, X_{\hat{k}}\} = X_{\hat{k}}/p_{\hat{k}} = z_{\hat{k}}$, the corresponding probability being $p_{z_{\hat{k}}}(X_{\hat{k}}) = p_{\hat{k}}$. We now proceed by induction. Suppose $X_m \geq z_m$ when $\hat{k} < m \leq l-1$. Then, $$X_{l'} = \frac{X_{\hat{k}}}{p_{\hat{k}}} + \sum_{m=\hat{k}+1}^l X_m \geq \frac{X_{\hat{k}}}{p_{\hat{k}}} + X_l. \quad \text{Equation 18}$$

Thus, to show that $X_{l'} \geq z_l = X_l/p_l$, it suffices to show that $\Gamma(x) \geq \Gamma(y)-y$ for any x, y>0 and $r \in (0,1)$, where $\Gamma(x) = x/(1-r^x)$. This follows since $\Gamma'(x) = \gamma(q^x)$, where $\gamma(z) = (1-z+z \log(z))/(1-z)^2$. Using the standard bound of $1/z-1 \leq \log z \leq z-1$, we find that $0 \leq \gamma(z) \leq 1$. The, integrating the corresponding bounds $\Gamma'(x) \geq 0$ and $\Gamma'(y)-1 \leq 0$, we find that $\Gamma(x) \geq \Gamma(0^+) = -1/\log(r) \geq \Gamma(y)-y$. Applying the terminal case l=n corresponding to the root node 546, we find that $X_0 =^d \hat{X}_0$, and have proved the first part of Theorem 3. The proof of the second part of Theorem 3 then follows using the maximum threshold $z_k$ in the example hierarchical sampling topology 500.

The foregoing development can be adapted to represent the counting samples implementation of stateful packet sampling. To support counting sample, the thresholds $z_k = X_k/p_k$ are replaced with $z_k = 1/p$, where p is the uniform packet sampling probability. The estimator $X_0$ associated with the root node 546 then corresponds to unbiased estimate of the number of packets, with the second part of Theorem 3 being satisfied with a maximum generalized sampling threshold of $\overline{\tau}_0 = 1/p$ (which may be used for corresponding confidence interval determination).

An example hierarchical sampling topology 600 corresponding to flow slicing of flow records that may be implemented by the example network traffic estimator of FIGS. 1 and/or 2 to perform network traffic estimation is illustrated in FIG. 6. Flow slicing is a multistage sampling and aggregation scheme having a sequence of operations 605 that are illustrated at the top of FIG. 6. In particular, the flow slicing operations 605 include an independent packet sampling operation 610 characterized by a probability q, sample-and-hold sampling operation 615 characterized by a probability p, and a threshold sampling operation 620 on multidimensional flow descriptors. A benefit of flow slicing is that the use of resources in the measurement infrastructure (such as flow cache lookup rate, flow cache occupation, export bandwidth, etc.) can be independently controlled by adjusting the sampling parameters of the separate operations 605. In the example of FIG. 6, flow slicing operates on three measurement dimensions, yielding three-dimensional weights of the form $X = (x^{(1)}, x^{(2)}, x^{(3)})$ where $x^{(1)}$ and $x^{(2)}$ are the numbers of bytes and packets, respectively, in a flow, and $x^{(3)}$ is the observed number of TCP SYN packets. In the illustrated example, it is assumed that all flows are TCP flows, with only the first packet in the flow having its TCP SYN flag set. Thus, for the first packet of a flow, the weight is $X = (x^{(1)}, 1, 1)$, while the weight for any other packet in the flow is $X = (x^{(1)}, 1, 0)$. The occurrence of TCP SYN packets can be used to estimate the number of flows.

In the example hierarchical sampling topology 600, each leaf node 622, 624, 626, 628 and 630 corresponds to a data source associated with a weight $X_k$ representative of the three measurement dimensions of number of bytes, number of packets and number of flows (corresponding to the occurrence of TCP SYN packets). Edges 632, 634, 636, 638 and 640, couple the leaf nodes 622, 624, 626, 628 and 630 to aggregation nodes 642, 644, 646, 648, 650 and 652 as shown. Each of these edges represents independent sampling of a respective leaf node weight with probability q. Edges 654, 656, 658 and 660 interconnect the aggregation nodes 642, 644, 646, 648, 650 and 652 as shown and represent sample-and-hold operations where the sampling is per packet (or, in other words, in the packet measurement dimension) with probability p. Then, the resulting flows aggregated at node 652 undergo multifactor threshold sampling represented by the edge 662 to yield the resulting estimate at the root node 664. This multifactor threshold sampling operation is characterized by the three-dimensional threshold $(z^{(1)}, z^{(2)}, z^{(3)})$ corresponding, respectively, to bytes, packets and flows, as well as the sampling probability $p(x) = \min\{1, \Sigma_{i=1}^3 x^{(i)}/z^{(i)}\}$. It is assumed that $$\frac{M_{min}}{z_1} + \frac{1}{z_2} + \frac{1}{z_3} < 1. \quad \text{Equation 19}$$

Otherwise, the multifactor threshold sampling operation associated with the sampling edge 662 would be trival, with $p(x)=1$ for all $x \neq 0$.

Examining the example hierarchical sampling topology 600 in greater detail, let $s \in \{0,1\}$ denote a packet SYN flag. Packet sampling of a packet $(x^{(1)}, 1, s)$ at one of the leaf nodes 622, 624, 626, 628 or 630 yields a weight at the respective aggregation node 642, 644, 646, 648, 650 or 652 of $(x^{(1)}/q, 1/q, s/q)$ according to Equation 4 and Equation 1. Then, based on discussion of the example hierarchical sampling topology 500, which is representative of sample-and-hold sampling, the sample-and-hold operations associated with the edges 654, 656, 658 and 660 can be represented as threshold sampling with packet threshold 1/pq, which is the size of the weight to be sampled (1/q) divided by the sample and hold packet sampling probability p. Furthermore, this can be extended to multifactor threshold sampling with thresholds (0,1/pq,0) as shown. The verification that the example hierarchical sampling topology 600 represents sample-and-hold packet sampling is similar to the proof for the byte sampling case represented by the example hierarchical sampling topology 500. In particular, after a first packet $\hat{k}$ is selected by sample-and-hold, the threshold $z^{(2)}=1/pq$ does not exceed $X_{j'}^{(2)}$ for any $j>\hat{k}$. Hence any subsequent packet weight that survives the initial independent packet sampling is selected by sample-and-hold with probability 1.

We now bound the maximum generalized sampling thresholds $\bar{\tau}_0 = (\bar{\tau}_0^{(1)}, \bar{\tau}_0^{(3)}, \bar{\tau}_0^{(3)})$ for flow slicing as represented by the example hierarchical sampling topology 600. First, as discussed above, the generalized thresholds τ for the initial independent packet sampling operations are bounded componentwise by $(M_{max},1,1)/q$, where $M_{max}$ is the MTU (or maximum packet size). Next, from the discussion of the example hierarchical sampling topology 500, the generalized thresholds for sample-and-hold sampling are bounded componentwise by $(M_{max},1,1)/(pq)$. For the multidimensional flow sampling operation, when $p(x)<1$, we have the trivial bounds on the generalized sampling thresholds of $\tau \leq (z^{(1)},z^{(2)},z^{(3)})$ as described above. However, the constraints between flow packet and byte size allow us to do better for the first two components. In particular, using the constraint developed in the discussion of flow slicing that $x^{(2)}M_{min} \leq x^{(1)} \leq x^{(2)}M_{max}$, where $M_{min}$ is a minimum possible packet size, it can be shown that $$\frac{x}{p(x)} \leq \left( \frac{x^{(1)}}{\frac{x^{(1)}}{z^{(1)}} + \frac{x^{(2)}}{z^{(2)}}}, \frac{x^{(2)}}{\frac{x^{(1)}}{z^{(1)}} + \frac{x^{(2)}}{z^{(2)}}}, \frac{1}{\frac{x^{(1)}}{z^{(1)}} + \frac{x^{(2)}}{z^{(2)}} + \frac{1}{z^{(3)}}} \right)$$

$$\leq \left( \frac{1}{\frac{1}{z^{(1)}} + \frac{1}{z^{(2)}M_{max}}}, \frac{1}{\frac{M_{min}}{z^{(1)}} + \frac{1}{z^{(2)}}}, z^{(3)} \right).$$

Equation 20

Summarizing, the overall byte, packet and SYN maximum generalized sampling thresholds for flow slicing are, respectively:

$$\bar{\tau}_0^{(1)} = \max \left\{ \frac{M_{max}}{pq}, \frac{z^{(1)}}{1 + \frac{z^{(1)}}{z^{(2)}M_{max}}} \right\}$$

Equation 21

$$\bar{\tau}_0^{(2)} = \max \left\{ \frac{1}{pq}, \frac{z^{(2)}}{1 + \frac{z^{(2)}M_{min}}{z^{(1)}}} \right\}$$

Equation 22

$$\bar{\tau}_0^{(3)} = \max \left\{ \frac{1}{pq}, z^{(3)} \right\}$$

Equation 23

Note that without the inclusion of $x^{(3)}$ in the multifactor threshold sampling probability, the effective threshold for SYN count estimation is infinite, that is, there would be no useful bound.

Figure 7:
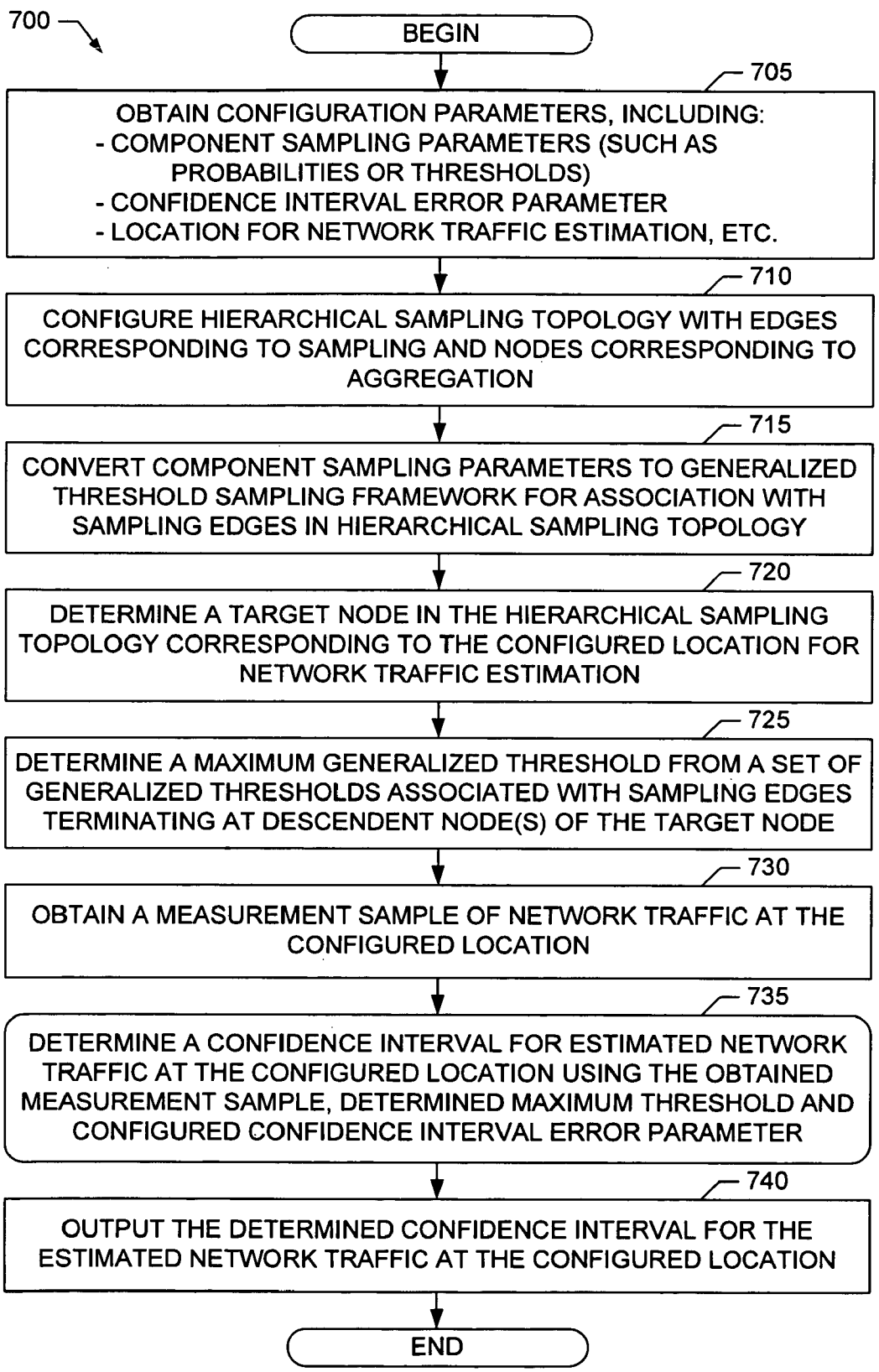
FIG. 7 is a flowchart representative of example machine readable instructions that may be executed to implement the example network traffic estimator of FIGS. 1 and/or 2.
Figure 8:
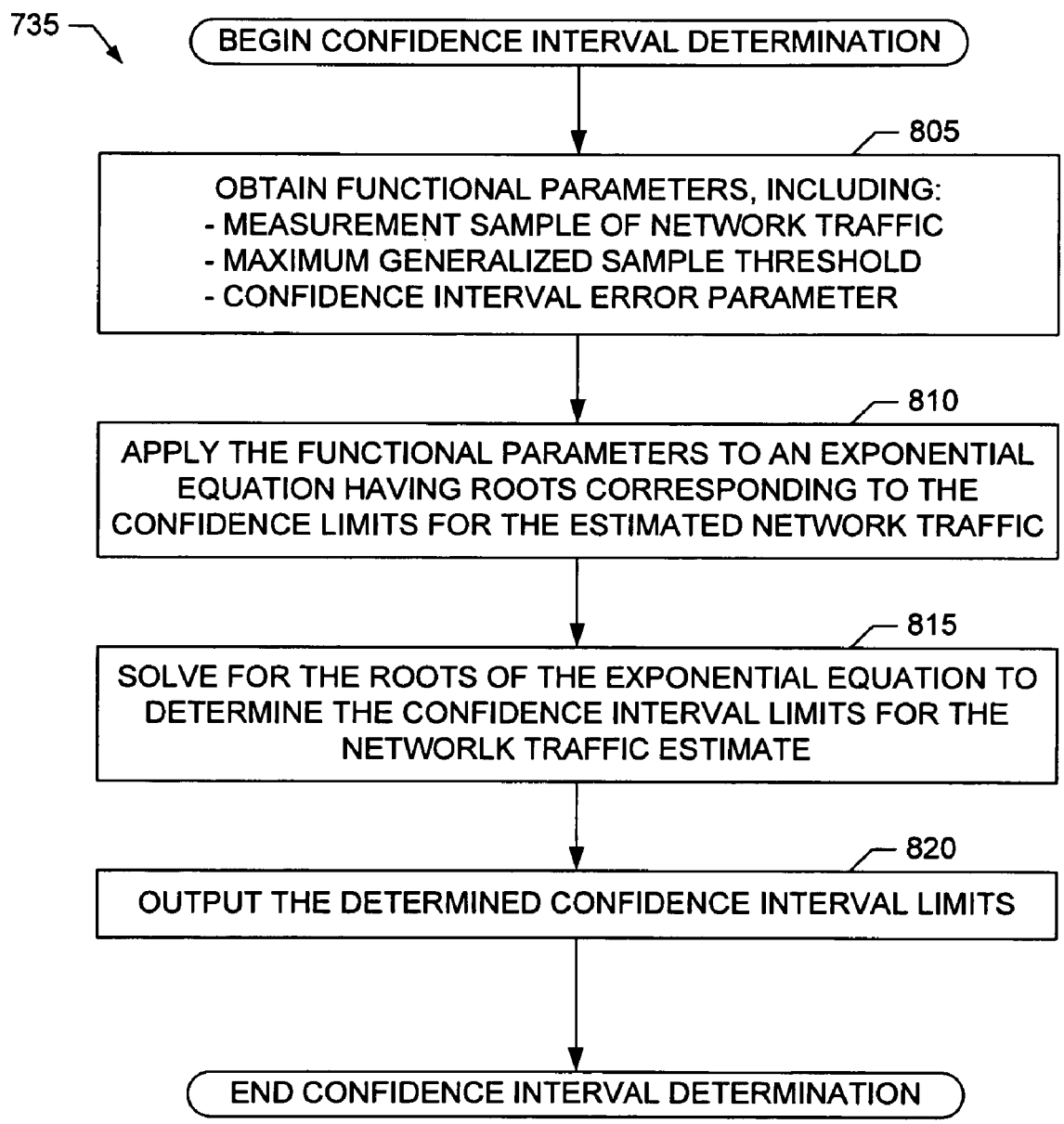
FIG. 8 is a flowchart representative of example machine readable instructions for performing confidence interval determination that may be used to implement the example machine readable instructions of FIG. 7 and/or executed to implement the example network traffic estimator of FIGS. 1 and/or 2.
Figure 9:
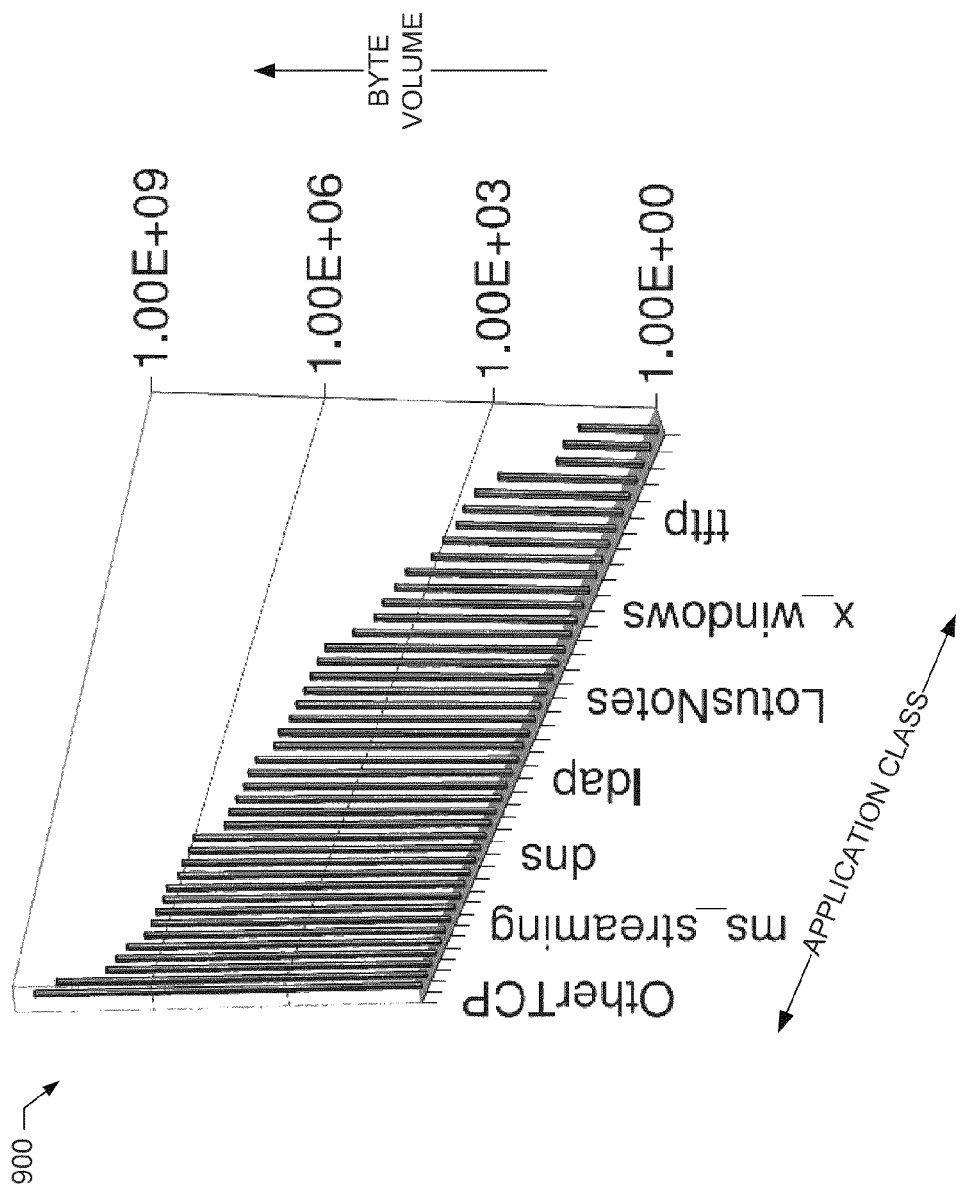
FIGS. 9-15 illustrate example performance results for the example network traffic estimator of FIGS. 1 and/or 2.

Flowcharts representative of example machine readable instructions that may be executed to implement the example network traffic estimator 105, the example measurement sampler 205, the example sampling topology configuration unit 210, the example generalized threshold sampling conversion unit 215, the generalized sampling threshold identifier 220, the example confidence interval estimator 225, the example parameter configuration unit 230 and/or the example presentation interface 235 are shown in FIGS. 7-8. In these examples, the machine readable instructions represented by each flowchart may comprise one or more programs for execution by: (a) a processor, such as the processor 1612 shown in the example computer 1600 discussed below in connection with FIG. 16, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1612, but the entire program or programs and/or portions thereof could alternatively be executed by a device other than the processor 1612 and/or embodied in firmware or dedicated hardware (e.g., implemented by an application specific integrated circuit (ASIC), a programmable logic device (PLD), a field programmable logic device (FPLD), discrete logic, etc.). For example, any or all of the example network traffic estimator 105, the example measurement sampler 205, the example sampling topology configuration unit 210, the example generalized threshold sampling conversion unit 215, the generalized sampling threshold identifier 220, the example confidence interval estimator 225, the example parameter configuration unit 230 and/or the example presentation interface 235 could be implemented by any combination of software, hardware, and/or firmware. Further, although the example machine readable instructions are described with reference to the flowcharts illustrated in FIGS. 7-8, many other techniques for implementing the example methods and apparatus described herein may alternatively be used. For example, with reference to the flowcharts illustrated in FIGS. 7-8, the order of execution of the blocks may be changed, and/or some of the blocks described may be changed, eliminated, combined and/or subdivided into multiple blocks.

Example machine readable instructions 700 that may be executed to implement the example network traffic estimator 105 of FIGS. 1 and/or 2 are represented by the flowchart shown in FIG. 7. The example machine readable instructions 700 may be executed at predetermined intervals, based on an occurrence of a predetermined event (such as when measured (estimated) network traffic usage is obtained), etc., or any combination thereof. With reference the example implementation of the network traffic estimator 105 illustrated in FIG. 2, the example machine readable instructions 700 of FIG. 7 begin execution at block 705 at which the example network traffic estimator 105 obtains one or more configuration parameters for use in determining a confidence interval associated with a network traffic estimate. For example, at block 705 the example parameter configuration unit 230 obtains any or all of (i) an error parameter (or probability) ε used by the example confidence interval estimator 225 to calculate the confidence interval, (ii) some or all of the hierarchical sampling topology information (such as nodes, edges, interconnections, sampling operations, weights, etc.) used by the example sampling topology configuration unit 210 to determine and/or represent the multistage sampling and aggregation topology for making network traffic measurements (estimates), (iii) generalized threshold sampling information (such as sampling probabilities, thresholds, etc.) used by the example generalized threshold sampling conversion unit 215 to determine generalized threshold probabilities and generalized sampling thresholds corresponding to the sampling and aggregation operations represented by the hierarchical sampling topology, (iv) a particular network location for network traffic estimation, etc.

Next, control proceeds to block 710 at which the example sampling topology configuration unit 210 included in the example network traffic estimator 105 configures a hierarchical sampling topology with nodes corresponding to data sources and/or aggregation operations, and edges corresponding to sampling operations. For example, the sampling topology configuration unit 210 may configure a sampling tree topology in which leaf nodes are associated with data sources, such as arriving packets of a data flow, and other nodes are associated with aggregation of the measurements (represented as weights) associated with lower, child nodes in the tree. Additionally, the example sampling topology configuration unit 210 may configure such an example sampling tree topology to have edges corresponding to sampling operations, such as the sampling operation $S_p(x)$ of Equation 4, characterized by a sampling probability $p(x)$ (specified, for example, at block 705). In such an example, the measurements (represented as weights) at a child node will be sampled according to the sampling probability $p(x)$ characteristic of the sampling operation $S_p(x)$ associated with the edge originating at the child node. The child node's sampled weight then contributes to the aggregation operation at its respective parent node according to Equation 1. Examples of configuring a hierarchical sampling topology to correspond to a specific multistage sampling and aggregation arrangement are illustrated in FIGS. 4-6.

Control next proceeds to block 715 at which the example generalized threshold sampling conversion unit 215 converts the component sampling parameters, such as sampling probabilities $p(x)$, associated with the edges in the hierarchical sampling topology to a generalized threshold sampling framework. For example, at block 715 the generalized threshold sampling conversion unit 215 may use Equation 3 to determine generalized sampling thresholds from the sampling probabilities $p(x)$ and a possible range of values to be sampled for each edge in the hierarchical sampling topology. Examples of determining generalized sampling thresholds for a hierarchical sampling topology are illustrated in FIGS. 4-6.

Next, at block 720 the example network traffic estimator 105 determines a target node in the hierarchical sampling topology that corresponds to particular network location specified at block 705 for which network traffic estimation is to be performed. For example, the target node may correspond to the root node of the hierarchical sampling topology, as was assumed in the preceding examples of FIGS. 3-6. However, the particular network location or, more generally, the particular network traffic estimate of interest, may correspond to any node in the hierarchical sampling topology.

Next, control proceeds to block 725 at which the example generalized sampling threshold identifier 220 included in the example network traffic estimator 105 selects a maximum generalized sampling threshold from the thresholds determined at block 715 for use in confidence interval determination. For example, at block 725 the example generalized sampling threshold identifier 220 may select the maximum generalized sampling threshold $\bar{\tau}_k$ from the set of generalized sampling thresholds $\tau_k$ determined for the hierarchical sampling topology using Equation 5. Alternatively, the maximum generalized sampling threshold $\bar{\tau}_k$ could be provided at block 725 to the example generalized sampling threshold identifier 220 via information obtained at block 705 from an external source (such as a user, control application, etc.)

Control then proceeds to block 730 at which the example measurement sampler 205 included in the example network traffic estimator 105 obtains a measured sample of network traffic for the particular network location specified at block 705. As described above, the measured sample of network traffic obtained at block 730 by the measurement sampler 205 takes the form of a sample weight determined through the multistage sampling and aggregation stages feeding the target node that was determined at block 720 to correspond to the particular network location. Depending on a particular implementation, the measurement sampler 205 may obtain the measured sample (or weight) of network traffic by performing the sampling and aggregation operations represented by the hierarchical sampling topology, by retrieving the measurement sample (or weight) from another device responsible for determining and/or storing the measurements, or by any other appropriate technique.

Next, control proceeds to block 735 at which the example confidence interval estimator 225 included in the example network traffic estimator 105 determines the confidence intervals corresponding to the measured sample (or weight) of network traffic obtained at block 730. For example, and as described above, at block 735 the example confidence interval estimator 225 determines upper and lower confidence limits that are functions of the measured sample (or weight) of network traffic obtained at block 730, the maximum generalized sampling threshold determined at block 725 and the error parameter specified at block 705. Example machine readable instructions that may be used to implement the processing at block 735 are illustrated in FIG. 8 and discussed in greater detail below.

After the confidence interval is determined at block 735, control proceeds to block 740 at which the example presentation interface 235 included in the example network traffic estimator 105 outputs the determined confidence interval corresponding to the measured sample (or weight) of network traffic obtained at block 730. For example, at block 740 the example presentation interface 235 may present the determined upper and lower confidence limits, as well as the measured sample (or weight) of network traffic, via a GUI implemented by and/or in communication with the example presentation interface 235. Additionally or alternatively, at block 740 the example presentation interface 235 may present one or more depictions of the accuracy of the determined confidence interval(s). After processing at block 740 completes, execution of the example machine readable instructions 700 ends.

Example machine readable instructions 735 for performing confidence interval determination that may be used to implement the processing at block 735 of FIG. 7 and/or executed to implement the example network traffic estimator 105 are illustrated in FIG. 8. Execution of the example machine readable instructions 735 of FIG. 8 begins at block 805 at which the example confidence interval estimator 225 included in the example network traffic estimator 105 obtains functional parameters, including (i) the measured sample (or weight) of network traffic, (ii) the maximum generalized sampling threshold and (iii) the error parameter, for use in determining the upper and lower confidence limits bounding the confidence interval corresponding to the measured sample (or weight) of network traffic.

Next, control proceeds to block 810 at which the example confidence interval estimator 225 applies the functional parameters obtained at block 805 to a nonlinear, exponential equation having roots corresponding to the upper and lower confidence limits bounding the confidence interval to be determined. For example, at block 810 the functional parameters may be applied to Equation 11 or the combination of Equation 12 and Equation 13 mentioned above.

Control then proceeds to block 815 at which the example confidence interval estimator 225 determines the roots of the nonlinear, exponential equation to which the functional parameters were applied at block 810. For example, at block 815 the example confidence interval estimator 225 can employ any appropriate root finding technique to find the roots of the nonlinear, exponential equation. The smaller of the two roots will correspond to the lower limit of the confidence interval, whereas the larger of the two roots will correspond to the upper limit of the confidence interval. The upper and lower confidence interval limits determined at block 815 are then output at block 820. Execution of the example machine readable instructions 735 then ends.

Example experimental performance results characterizing the accuracy of the confidence intervals determined by the example network traffic estimator 105 are illustrated in FIGS. 9-15. The presented performance results are based on a dataset of 85,680 flow records, collected using unsampled NetFlow and exported from an Internet gateway router. The distribution of bytes reported in the flow records was quite heavy-tailed with a single record containing 78% of the total weight. Packet were classified by application type based on TCP/UDP port number, with the statistics for the resulting flows for each application type listed in Table 1. The set of applications listed in Table 1 were chosen in order to obtain a spectrum of different statistic properties over the applications. For example, although less than 1% of the flows are for the file transfer protocol (ftp) application, they represent most of the byte weight. Conversely, nearly half the flows are for domain name service (dns), yet they represent less than 0.1% of the byte weight.

TABLE 1

| Application | Bytes | % of Traffic | # Flows | % Flows | Max Flow Size | Average | Min |
|---|---|---|---|---|---|---|---|
| all | 4265677642 | 100.00 | 85680 | 100.00 | 3372865057 | 49786 | 28 |
| ftb | 394832734 | 79.58 | 727 | 0.84 | 3372865057 | 4669646 | 40 |
| web | 80120429 | 1.87 | 7787 | 9.08 | 3139196 | 10289 | 40 |
| mail | 5387032 | 0.12 | 1495 | 1.74 | 1326756 | 3603 | 40 |
| dns | 4083277 | 0.09 | 40767 | 47.58 | 621812 | 100 | 40 |

The analyzed performance of the confidence intervals determined by the example network traffic estimator 105 included the effects of packet sampling. For example, confidence interval determination for multistage sampling and aggregation similar to the example of FIG. 4 was examined for packet sampling rates of 1/N with N=10, 100 and 1,000, and for threshold sampling with thresholds z=5,000, 50,000 and 500,000. For each application, and for each pair of parameters (1/N, z) taking these values, 2,500 independent estimates $X_0$ of the true byte size $\overline{X}_0 = \Sigma_{i,j} x_{i,j}$ were calculated, the sum being over all flows i and packets j within each flow as shown in the example of FIG. 5.

First, we investigated conformance with confidence intervals defined by Theorem 2 above. The actual byte volumes $\overline{X}_0$ for each application class are shown in an ordered representation in the graph 900 of FIG. 9. For each application class, we generated the confidence intervals $X_\pm(\epsilon, X_0, \overline{\tau}_0)$ for each of the 2,500 measured (estimated) byte volumes $X_0$ of the actual byte volume $\overline{X}_0$ in that class, using $\epsilon$=5%. We then compiled the statistics of violation of the upper or lower limits of the confidence interval. The proportions of runs in which $\overline{X}_0 > X_+(\epsilon, X_0, \overline{\tau}_0)$ and, thus, resulted in violation of the upper limit are displayed in the graph 1000 of FIG. 10. Similarly, the proportions of runs in which $\overline{X}_0 < X_-(\epsilon, X_0, \overline{\tau}_0)$ and, thus, resulted in violation of the lower limit are displayed in the graph 1100 of FIG. 11.

For a confidence limit based on a true distribution (rather than a bound), we would expect the confidence limits to be violated in a proportion $\epsilon$=5% of the experimental runs. As depicted in graphs 1000 and 1100, the proportion of violations for the experimental runs was actually less than $\epsilon$=5% in all examined cases, with the percentage of violations being about 3% at most. Note that in many cases there was no observed violation at all. Thus, confidence intervals determined by the example network traffic estimator 105 are somewhat conservative. However, this is satisfactory in many, if not most scenarios, as these conservative confidence intervals lead to overestimation of estimation errors, rather than under-estimation.

Figure 10:
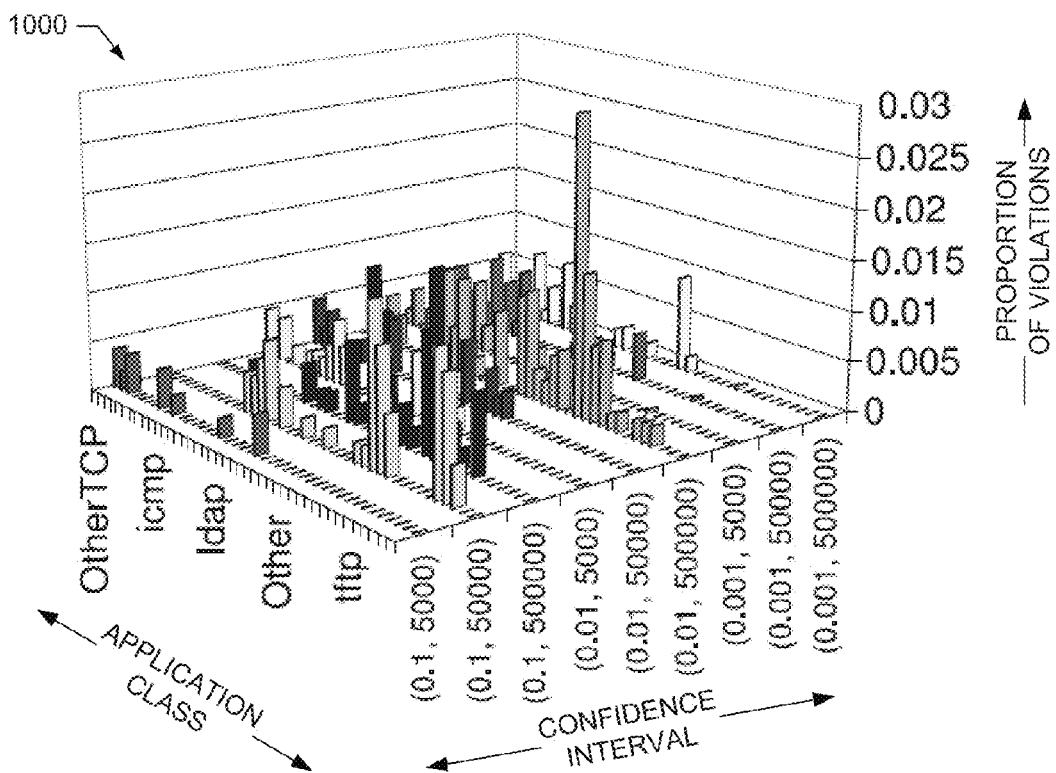
Figure 11:
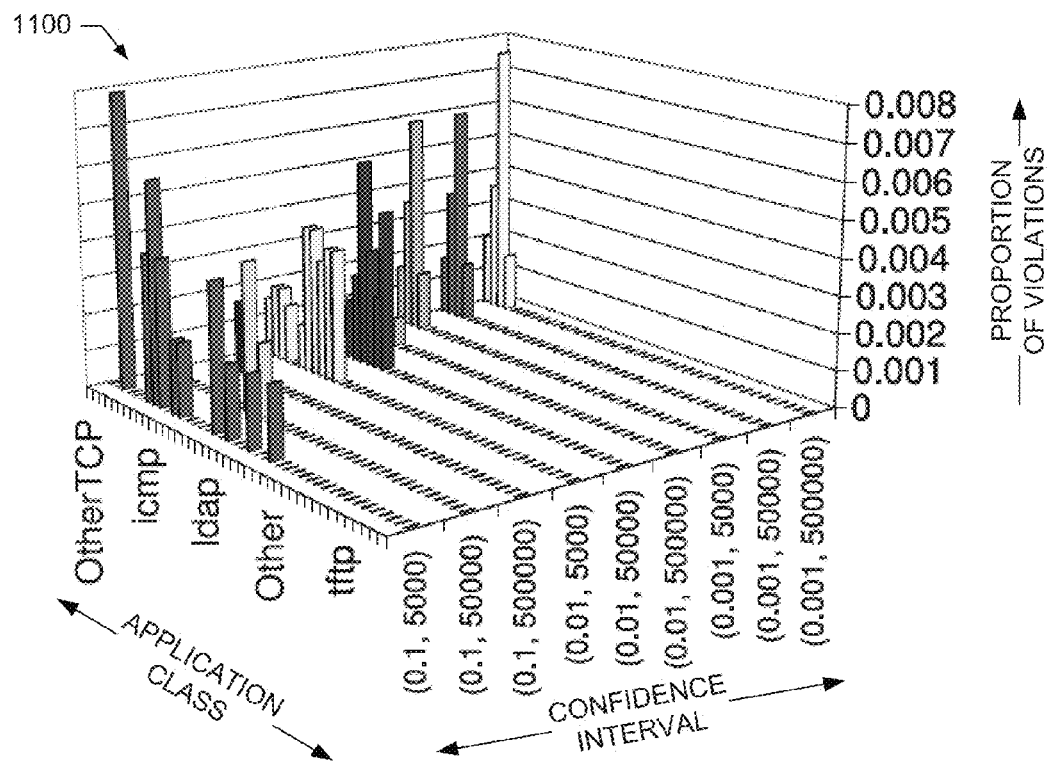

The results presented in the graph 1000 of FIG. 10 concern the single confidence level of 5%. In order to examine how the estimate error is distributed over the bound represented by the determined confidence interval, we also constructed quantile-quantile plots of the estimates against the distribution bounds. This is done as follows. For each application type, we ordered the experimental estimates as $x_1 \leq x_2 \leq \ldots \leq x_{2500}$. Thus, $x_i$ is an estimate of the $q_i^{th}$ quantile of $\overline{X}_0$, where $q_i = (i-1)/2499$. For $q_i < \frac{1}{2}$, we let $q_i$ play the role of $\epsilon$ in Equation 8, and seek a lower bound for the $q_i^{th}$ quantile to be the largest x for which we know that $$Pr_{\overline{X}_0}[X_0 < x] \leq q_i \qquad \text{Equation 24}$$

Thus we seek such a value $y_i$ that is the root in $[0, \overline{X}_0)$ to the equation $$q_i = K(y_i/\overline{X}_0 - 1)^{\overline{X}_0/\overline{\tau}_0} \qquad \text{Equation 25}$$

One can show that such a root is unique when $q_i > e^{-\overline{X}_0/\overline{\tau}_0}$. Otherwise, we take $y_i$=0. When $q_i > \frac{1}{2}$, we let $q_i$ play the role of $1-\epsilon$ in the upper bound of Equation 7 and seek an upper bound $y_i$ for the $q_i^{th}$ quantile as the root in $(\overline{X}_0, \infty)$ to the equation $$1 - q_i = K(y_i/\overline{X}_0 - 1)^{\overline{X}_0/\overline{\tau}_0} \qquad \text{Equation 26}$$

It can be shown that such roots are unique.

Figure 12:
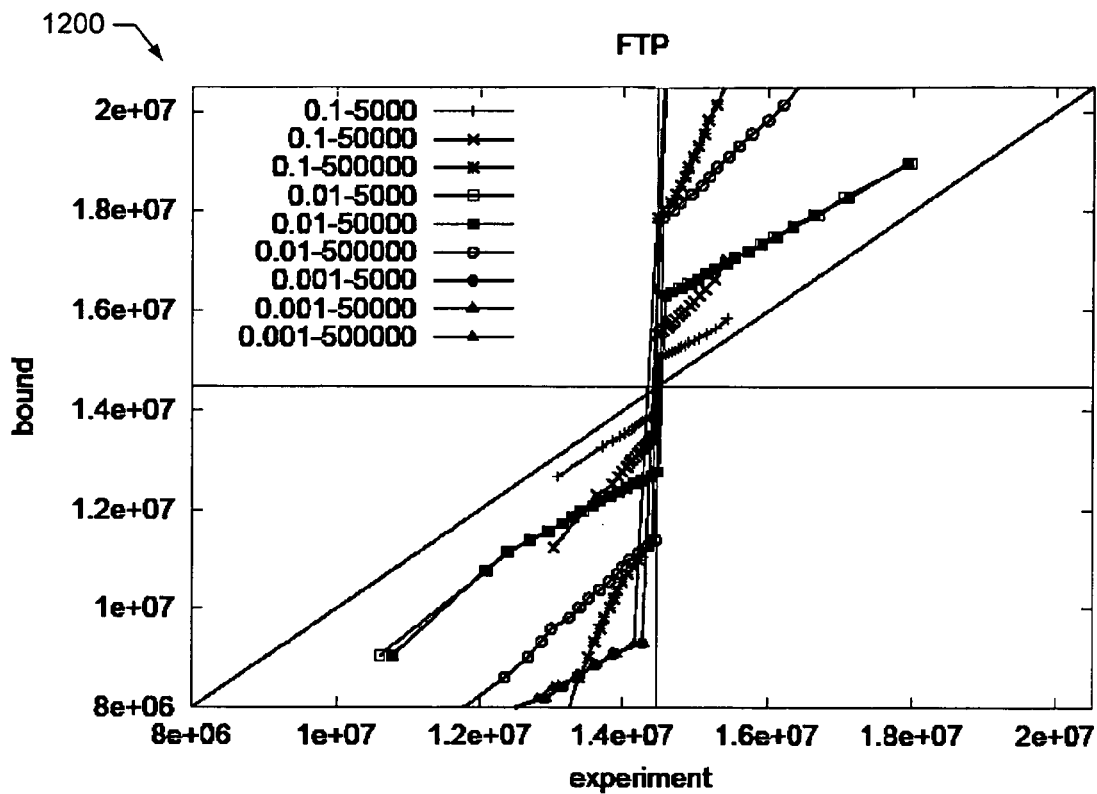
Figure 13:
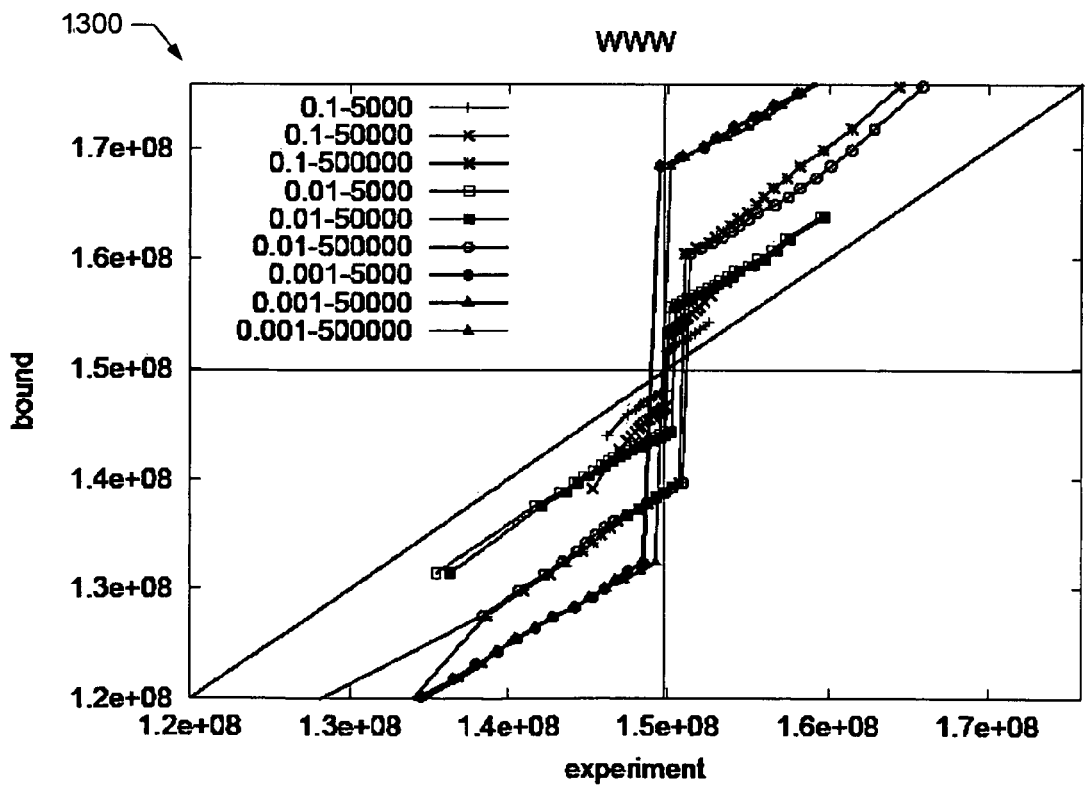
Figure 14:
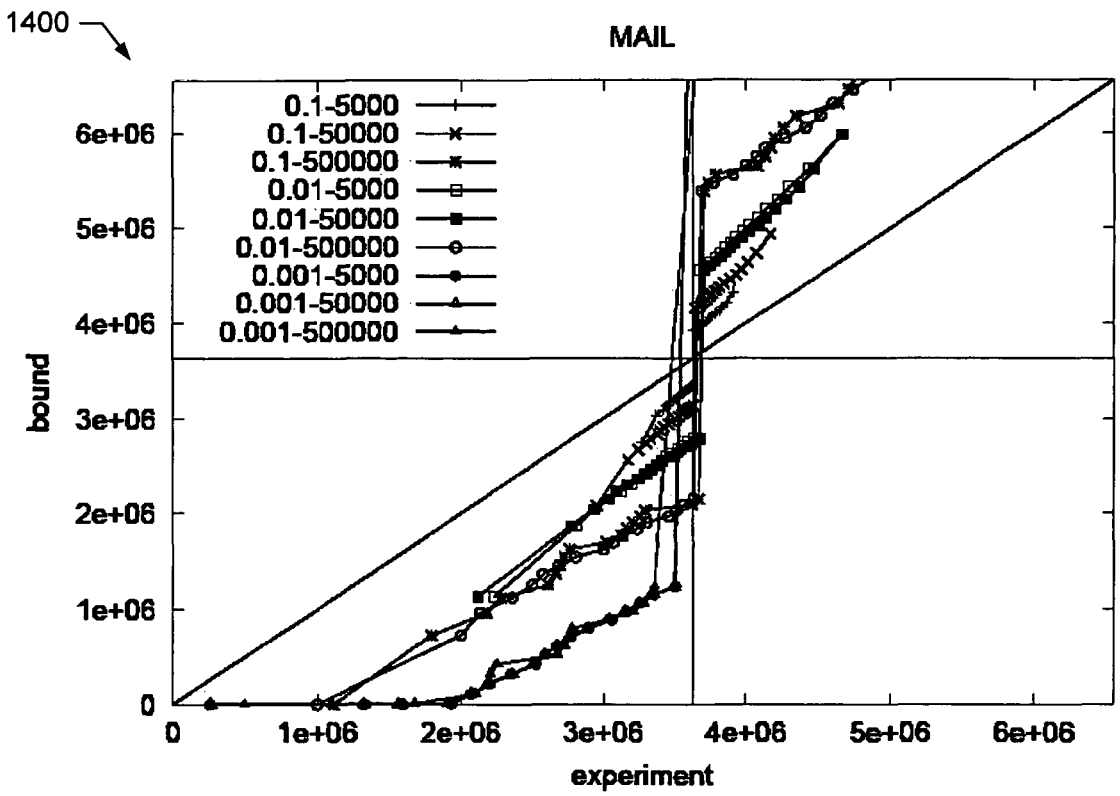
Figure 15:
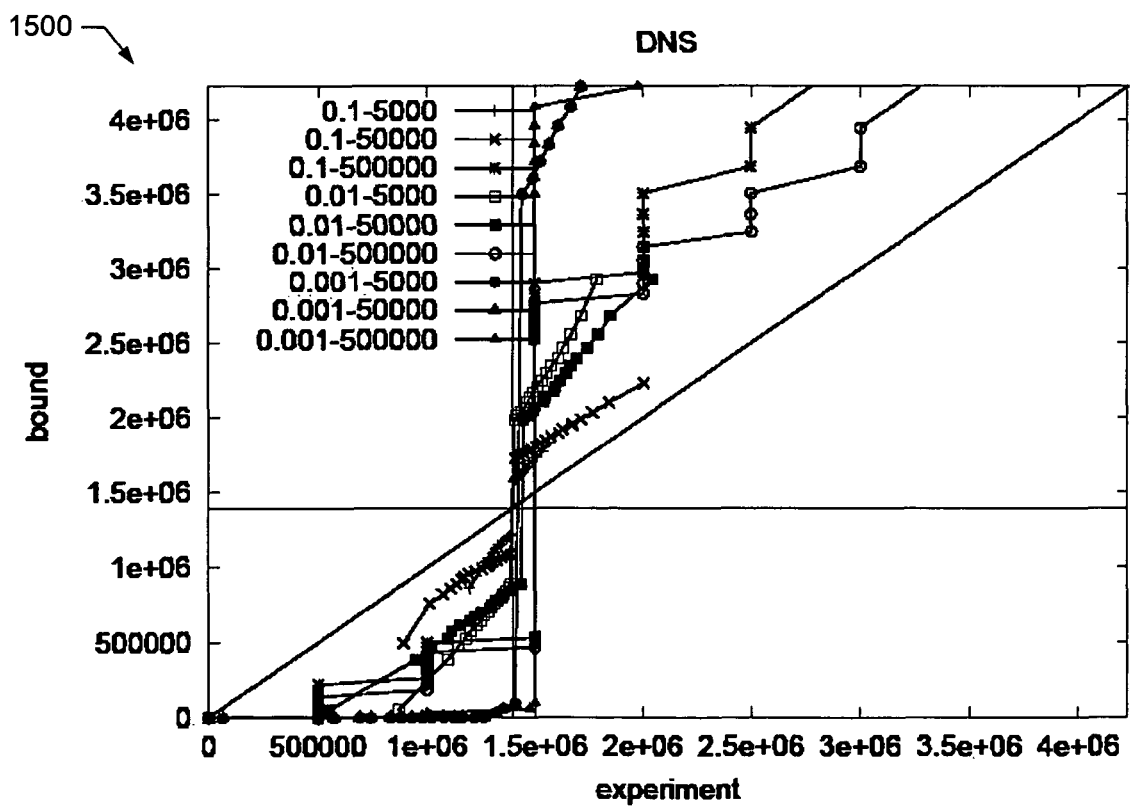

The quantile-quantile plots then use the points $(x, y_i)$. FIGS. 12-15 illustrate these bounds for the selection of applications indicated in FIG. 9. In the graphs of FIGS. 12-15, the solid vertical and horizontal lines show the actual traffic volume, and the line y=x is also shown. The graph 1200 of FIG. 12 depicts the quantile-quantile plots when the application is ftp. The graph 1300 of FIG. 13 depicts the quantile-quantile plots when the application is www. The graph 1400 of FIG. 14 depicts the quantile-quantile plots when the application is mail. The graph 1500 of FIG. 15 depicts the quantile-quantile plots when the application is dns. These applications were chosen in order to give a range or packet and flow size distributions. In all cases, we see the bound represented by the confidence interval is, as expected, mostly conservative in the sense that $y_i > x_i$ for $x_i > \overline{X}_0$ and $y_i < x_i$ when $x_i < \overline{X}_0$. Some slight deviation from this rule arises for two reasons. Firstly, the empirical median is not exactly equal to the true value $\overline{X}_0$ and, secondly, for clarity we have plotted only 1 in every 77 quantiles, causing the jump from the upper and lower bounding regimes in the plots to be not exactly around the median.

Also of interest is the variation in the quantile-quantile plots according to the sampling parameters (1/N, z). The quantile-quantile plots in FIGS. 12-15 all correspond to an MTU of 1500 bytes. As such, when 1/N=0.001, we have NM>z for all z∈ {5000,50000,5000000}, causing packet sampling error to dominate the bound. Thus, in FIGS. 12-15, the curves corresponding to 1/n=0.001 roughly coincide for all z values. On the other hand, the curves for (0.1,500000) and (0.01,500000) in FIGS. 12-15 roughly coincide because z>NM in both of these cases, causing the flow sampling error to dominate. Furthermore, the size of the typical error is larger for larger N and z, as expected.

Figure 16:
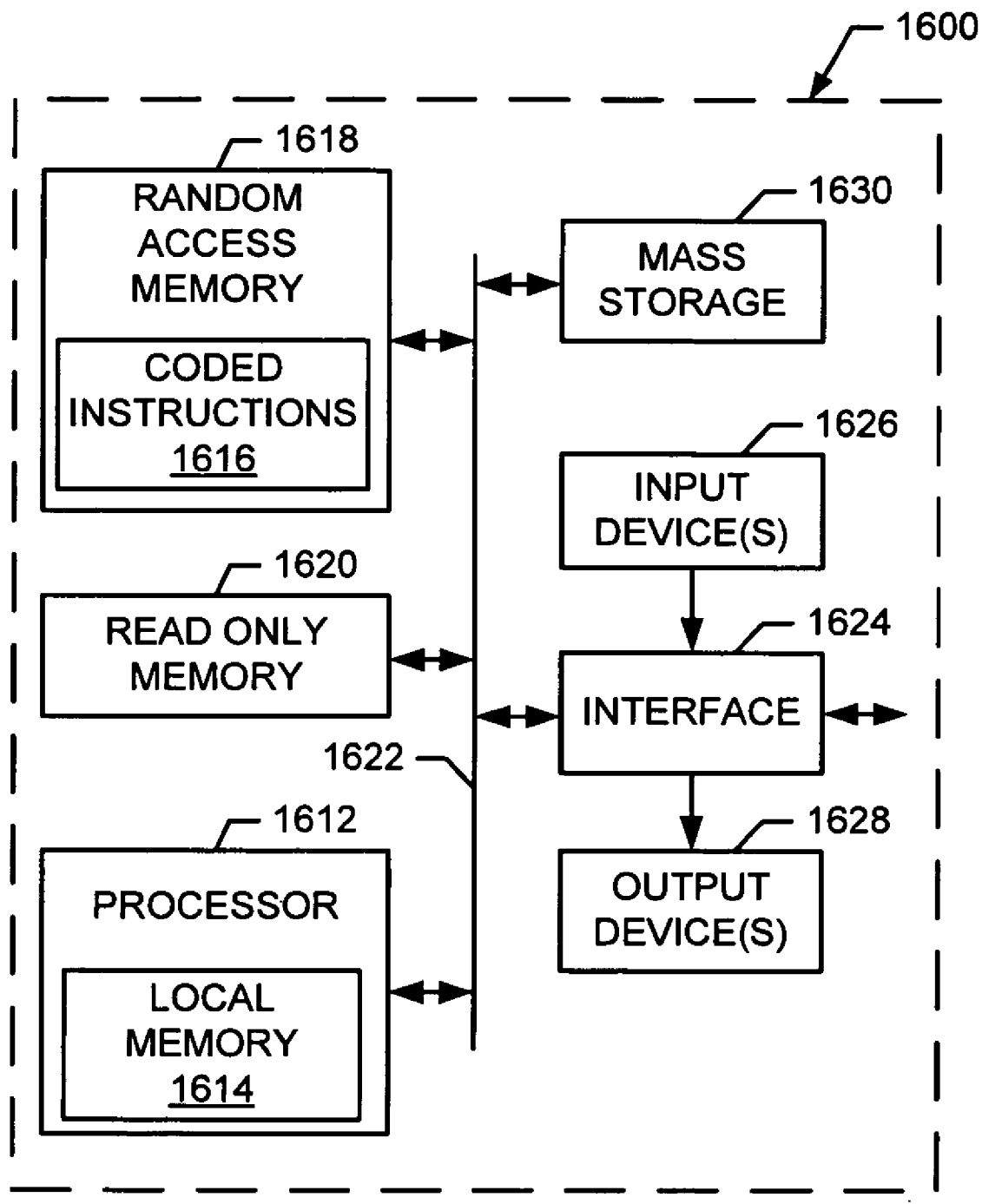
FIG. 16 is a block diagram of an example processing system that may execute the example machine readable instructions of FIGS. 7 and/or 8 to implement the example network traffic estimator of FIGS. 1 and/or 2.

FIG. 16 is a block diagram of an example computer 1600 capable of implementing the apparatus and methods disclosed herein. The computer 1600 can be, for example, a server, a personal computer, a personal digital assistant (PDA), an Internet appliance, a DVD player, a CD player, a digital video recorder, a personal video recorder, a set top box, or any other type of computing device.

The system 1600 of the instant example includes a processor 1612 such as a general purpose programmable processor. The processor 1612 includes a local memory 1614, and executes coded instructions 1616 present in the local memory 1614 and/or in another memory device. The processor 1612 may execute, among other things, the machine readable instructions represented in FIGS. 7-8. The processor 1612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 is typically controlled by a memory controller (not shown).

The computer 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, typically includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1600 also includes one or more mass storage devices 1630 for storing software and data. Examples of such mass storage devices 1630 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

Additional mathematical detail regarding derivation of the bounds and confidence limits described above are described in the remainder of this patent.

Bounding functions and their estimates: In establishing bounds for exponential moments of the sampling operator $S_p(x)$, we shall employ a bounding function which captures the interpretation of $\delta_p, \tau_p$ as thresholds. Define $f: R \times [0,\infty)^3 \to [0,\infty)$ by $$f(\theta, x, \delta, \tau) = \begin{cases} 1 + x(e^{\theta\tau} - 1)/\tau, & x < \delta \\ e^{\theta x}, & x \geq \delta \end{cases} \quad \text{Equation 27}$$

and then its d-dimensional analog $h: R \times [0,\infty)^{3d} \to [0,\infty)^d$:

$$h(\theta, x, \delta, \tau) = (f(\theta, x^{(1)}, \delta^{(1)}, \tau^{(1)}), \ldots f(\theta, x^{(d)}, \delta^{(d)}, \tau^{(d)})). \quad \text{Equation 28}$$

Here we extend by continuity the function $(e^{\theta\tau}-1)/\tau$ to the value $\theta$ as $\tau \to 0$. We will sometimes refer to the components of h as $(h^{(i)})$. Inequalities involving h will be understood componentwise. The main interpretation of h as bounding exponential moments comes in Theorem 4 (iii) below. The properties under aggregation and sampling estimation are in parts (i) and (ii) respectively; (iii) follows from (ii) as a special case Theorem 4: (i) Let $x = \Sigma_{j=1}^n x_j \in [0,\infty)^d$ with $x_j^{(i)} \geq 0$. Then for each i:

$$f(\theta, x^{(i)}, \delta^{(i)}, \tau^{(i)}) \leq \prod_{j=1}^n f(\theta, x_j^{(i)}, \delta^{(i)}, \tau^{(i)}) \quad \text{Equation 29}$$

and hence, componentwise in h, $$h(\theta, -1pt, \delta-1pt, \tau-1pt) \leq \quad \text{Equation 30}$$

$$\prod_{j=1}^n h(\theta, -1pt_j, \delta-1pt, \tau-1pt)$$

(ii) $E[h(\theta, S_p(x), \delta, \tau)] \leq h(\theta, x, \max\{\delta, \delta_p\}, \max\{\tau, \tau_p\})$, componentwise, where the maximum is also componentwise.

(iii) $E[\exp(\theta S_p(x))] \leq h(\theta, x, \delta_p, \tau_p)$, componentwise. The proof of Theorem 4 will require the following Lemma 1.

Lemma 1: (i) For all $\theta \in R$, $z \to (e^{\theta z}-1)/z$ is nondecreasing.
(ii) For all $\theta \in R$ and $z, \delta, \tau \geq 0$, $e^{\theta z} \leq f(\theta, z, \delta, \tau)$.

Proof: (i) The derivative of $z \mapsto (e^{\theta z}-1)/z$ is $(1+e^{\theta z}(\theta z-1))/z^2$ which is nonnegative since $e^{-y} \geq 1-y$ for any $y \in R$, which rearranges to $1+e^y(y-1) \geq 0$). (ii) From Equation 27 we have equality if $x \geq \delta$. Otherwise we have $x < \delta \leq \tau$ and the result for part (ii) of Lemma 1 follows from part (i) of this Lemma.

Proof of Theorem 4 (i): First assume $x \geq \delta$. Then $f(x) = e^{\theta x} = \Pi_j e^{\theta x_j}$. The result of part (i) of Theorem 4, the follows from Lemma 1 (ii). Henceforth assume $0 \leq x < \delta$. Observe that $1+x(e^{\theta\tau}-1)/\tau \leq \Pi_{j=1}^n (130 \, xj(e^{\theta\tau}-1)/\tau)$. For an inductive proof of the preceding statement, assume $\{a_j: j=1, 2, \ldots\}$ with either all $a_j > 0$ or all $a_j \in [-1, 0]$. If $\Pi_{j=1}^n(1+a_j) \geq 1+\Sigma_{j=1}^n a_j$, then $\Pi_{j=1}^{n+1}(1+a_j) \geq (1+a_{n+1})(1+\Sigma_{j=1}^n a_j) = 1+\Sigma_{j=1}^{n+1} a_j + a_{n+1}\Sigma_{j=1}^n a_j) \geq 1+\Sigma_{j=1}^{n+1} a_j$. Thus $f(\theta, x, \delta, \tau) \leq \Pi_{j=1}^n g(\theta, x_j, \delta, \tau, x)$, where:

$$g(\theta, x_j, \delta, \tau, x) = \begin{cases} 1 + x_i(e^{\theta\tau}-1)/z, & x < \delta \\ e^{\theta x_i}, & x \geq \delta \end{cases} \quad \text{Equation 31}$$

Since the $x_j \geq 0$, $x_j \geq \delta$ implies $x \geq \delta$ and hence $g(\theta, x_j, \delta, \tau) = e^{\theta x_j}$. On the other hand, if, $x_j < \delta$ then $x_j \leq \tau$ and by Lemma 1, $e^{\theta x_j} \leq 1 + x_j(e^{\theta\tau}-1)/\tau$. This establishes that $g(\theta, x_j, \delta, \tau, x) \leq f(\theta, x_j, \delta, \tau)$, and the result or part (i) of Theorem 4 follows.

Proof of Theorem 4 (ii): Consider the first component of $E[h(\theta, S_p(x), \delta, \tau)]$ and for brevity denote $x = x^{(1)}$, $\delta = \delta^{(1)}$ and $\tau = \tau^{(1)}$. Then:

$$E[h^{(1)}(\theta, S_p(x), \delta, \tau)] = (1-p(x))f(\theta, 0, \delta, \tau) + \quad \text{Equation 32}$$

$$p(x)f(\theta, x/p(x), \delta, \tau)$$

$$= 1 + p(x)(f(\theta, x/p(x), \delta, \tau) - 1$$

$$= \begin{cases} 1 + x\dfrac{e^{\theta\tau}-1}{\tau}, & x/p(x) < \delta \\ 1 + p(x)(e^{\theta x/p(x)}-1), & x/p(x) \geq \delta \end{cases}$$

In the last line of Equation 32, if $x < \delta_p$, then $x/p(x) \leq \tau_p$ and so by Lemma 1 $p(x)(e^{\theta x/p(x)}-1) \leq x(e^{\theta\tau_p}-1)/p$. On the other, if $x \geq \delta_p$, then $p(x) = 1$ and so $1+p(x)(e^{\theta x/p(x)}-1) = e^{\theta x}$. Hence:

$$E[h^{(1)}(\theta, S_p(x), \delta, \tau)] \leq \quad \text{Equation 33}$$

$$\begin{cases} 1 + x\dfrac{e^{\theta\max\{\tau, \tau_p\}}-1}{\max\{\tau, \tau_p\}}, & x < \max\{\delta, \delta_p\} \\ e^{\theta x}, & x \geq \max\{\delta, \delta_p\} \end{cases} =$$

$$f(\theta, x, \max\{\delta, \delta_p\}, \max\{\tau, \tau_p\}).$$

Proof of Theorem 4 (iii): Part (iii) of Theorem 4 follows as a special case of part (ii) since $h(\theta, S_p(x), 0, 0) = \exp(\theta S_p(x))$.

Bounding exponential moments of sampling processes: When k is a descendant of j let $\tau_{j,k} = (\tau_{j,k}^{(1)}, \ldots, \tau_{j,k}^{(d)})$ denote the componentwise maximum of the thresholds $\tau_{k'}$ on the path from j to k, excluding $\tau_j$, i.e., $$\tau_{j,k}^{(i)} = \max\left\{\tau_k^{(i)}, \max_{k' \in a(k) \cap d(j)} \tau_{k'}^{(i)}\right\}. \quad \text{Equation 34}$$

The thresholds $\delta_{j,i}$ are defined similarly. Similar to Equation 5 we define:

$$\delta_k = \max_{j \in d(k)} \delta_j. \quad \text{Equation 35}$$

Also define $$F(\theta, x, \tau) = \exp(x(e^{\theta\tau}-1)/\tau). \quad \text{Equation 36}$$

Theorem 5: (i)

$$E[h(\theta, X_k, \delta, \tau) | \{X_j : j \in c(k)\}] \leq \prod_{j \in c(k)} h(\theta, X_j, \max\{\delta, \delta_j\}, \max\{\tau, \tau_j\}).$$

Equation 37

(ii) $E[h(\theta, X_k, \delta, \tau)] = h(\theta, X_k, \delta, \tau)$ if $k \in R$, and otherwise:

$$E[h(\theta, X_k, \delta, \tau)] \leq \prod_{j \in R_k} h(\theta, X_j, \max\{\delta, \delta_{k,j}\}, \max\{\tau, \tau_{k,j}\})$$

Equation 38

(iii) For each $i = \{1, \ldots, d\}$, $$E[e^{\theta X_0^{(i)}}] \leq \prod_{k \in R} f(\theta, X_k^{(i)}, \overline{\delta}_0^{(i)}, \overline{\tau}_0^{(i)}) \leq F(\theta, \overline{X}_0^{(i)}, \overline{\tau}_0^{(i)}).$$

Equation 39

Proof of Theorem 5 (i):

$$E[h(\theta, X_k, \delta, \tau) | X_{j'}, j' \in c(k)] =$$

$$E\left[h\left(\theta, \sum_{j \in c(k)} S_j(X_j), \delta, \tau\right) \Big| X_{j'}, j' \in c(k)\right] \leq$$

$$E\left[\prod_{j \in c(k)} h(\theta, S_j(X_j), \delta, \tau) \Big| X_{j'}, j' \in c(k)\right] =$$

$$\prod_{j \in c(k)} E[f(\theta, S_j(X_j), \delta, \tau) | X_j] \leq$$

$$\prod_{j \in c(k)} h(\theta, X_j, \max\{\delta, \delta_j\}, \max\{\tau, \tau_j\})$$

Equation 40

The transition from the second line to the third line of Equation 40 uses Lemma 1 (ii). The transition from the third line to the fourth line of Equation 40 uses independence of sampling. The transition from the fourth line to the fifth line of Equation 40 uses Theorem 4 (i).

Proof of Theorem 5 (ii): Part (ii) of Theorem 5 holds trivially for leaf nodes k. We establish the general case inductively. Suppose part (ii) holds for all children k of a node l. Then $$E[h(\theta, X_\ell, \delta, \tau)] = E[E[h(\theta, X_\ell, \delta, \tau) | X_k : k \in c(\ell)]] \leq$$

$$\prod_{k \in c(\ell)} E[h(\theta, X_k, \max\{\delta, \delta_k\}, \max\{\tau, \tau_k\})] \leq$$

$$\prod_{k \in c(\ell)} \prod_{i \in R_k} h(\theta, X_i, \max\{\delta, \delta_k, \delta_{k,i}\}, \max\{\tau, \tau_k, \tau_{k,i}\}) =$$

$$\prod_{i \in R_\ell} h(\theta, X_i, \max\{\delta, \delta_{\ell,i}\}, \max\{\tau, \tau_{\ell,i}\})$$

Equation 41

The transition from the second line to the third line of Equation 41 uses Lemma 4 (ii). The transition from the third line to the fourth line of Equation 41 is the assumption on c(l). The from the fourth line to the fifth line of Equation 41 is just a rearrangement.

Proof of Theorem 5 (iii): The first inequality in part (iii) is just the componentwise version of part (ii) in the special case $\delta = \tau = 0$ since $h(\theta, x, 0, 0) = (e^{\theta x^{(i)}})$. The second inequality part (iii) then follows from Lemma 1 and the fact that for $\tau \geq 0$, $$f(\theta, x, \delta, \tau) \leq F(\theta, x, \tau),$$

Equation 42

(extending by continuity to $\tau=0$). This follows since neither $1+x(e^{\theta\tau}-1)/\tau$ nor $e^{\tau x}$ exceed $F(\theta,x,\tau)$.

Proof of Theorem 1: It suffices to prove Theorem 1 for the root node k=0. The Chernoff upper bound for $X_0^{(i)}$ follows from Theorem 5 (iii):

$$Pr[X_0^{(i)} \geq (1+\sigma)\overline{X}_0^{(i)}] \leq \inf_{\theta \geq 0} E[e^{\theta X_0^{(i)}}]e^{-(1+\sigma)\theta \overline{X}_0^{(i)}} \leq$$

$$\inf_{\theta \geq 0} \exp\left(\overline{X}_0^{(i)}\left(\frac{e^{\theta \overline{\tau}_0^{(i)}} - 1}{\overline{\tau}_0^{(i)}}\right) - (1+\sigma)\theta\right) = K(\sigma)^{\overline{X}_0^{(i)}/\overline{\tau}_0^{(i)}}$$

Equation 43

The proof for the lower bound is similar.

What is claimed is:

1. A method to determine confidence intervals for network traffic estimation, the method comprising:
    determining a hierarchical sampling topology representative of multiple data sampling and aggregation stages, the hierarchical sampling topology comprising a plurality of nodes connected by a plurality of edges, each node corresponding to at least one of a data source and a data aggregation operation, and each edge corresponding to a respective data sampling operation characterized by a respective generalized sampling threshold determined from a respective sampling probability function also characterizing the respective data sampling operation;
    selecting one of the generalized sampling thresholds to obtain a selected generalized sampling threshold, the selected generalized sampling threshold being selected from a set of the generalized sampling thresholds associated with a respective set of the edges originating at a respective set of the nodes, the set of the nodes being a set of descendent nodes of a target node undergoing network traffic estimation; and
    transforming a measured sample of network traffic associated with the target node into a confidence interval for a network traffic estimate associated with the target node using the selected generalized sampling threshold and an error parameter.

2. A method as defined in claim 1 wherein selecting one of the first generalized sampling thresholds comprises selecting a maximum generalized sampling threshold from the set of the generalized sampling thresholds.

3. A method as defined in claim 1 wherein the selected generalized sampling threshold is selected independently of any data aggregation operation associated with any node in the hierarchical sampling topology.

4. A method as defined in claim 1 wherein transforming the measured sample of network traffic into the confidence interval is based on the selected generalized sampling threshold and no other generalized sampling threshold.

5. A method as defined in claim 1 wherein the sampling probability function characterizing each data sampling operation corresponding to each edge represents probabilities of weights representative of data associated with an origination node connected to the edge being sampled by the data sampling operation, each sampling probability function mapping possible weight values to sampling probability values from zero to one, and further comprising determining a particular generalized sampling threshold to characterize a particular data sampling operation corresponding to a particular one of the edges connected to a particular one of the nodes to be a maximum value of a ratio of possible weight values to corresponding sampling probability values for those possible weight values associated with the particular node having sampling probability values strictly less than one.

6. A method as defined in claim 1 wherein transforming the measured sample of network traffic into the confidence interval comprises determining an upper confidence limit and a lower confidence limit from an expression parameterized by the measured sample of network traffic, the selected generalized sampling threshold and the error parameter.

7. A method as defined in claim 6 wherein the upper confidence limit and the lower confidence limit each correspond to a respective root of the expression, and wherein the expression is parameterized by only the measured sample of network traffic, the selected generalized sampling threshold and the error parameter.

8. A method as defined in claim 1 wherein the hierarchical sampling topology is representative of threshold sampling of packet sampled flow records, and wherein the hierarchical sampling topology comprises:
   a plurality of source nodes from the plurality of nodes, the plurality of source nodes characterized by a respective plurality of first weights representative of packets associated with one or more network flows;
   a set of aggregation nodes from the plurality of nodes, the set of aggregation nodes representing a set of flow record aggregation operations and characterized by a respective set of second weights representative of flow records associated with one or more network flows, each aggregation node connected to a respective set of source nodes by a respective set of first edges from the plurality of edges, each first edge representing a uniform packet sampling operation characterized by a first-level generalized sampling threshold equal to a maximum packet size multiplied by a specified number of sequential first weights from which one first weight is to be sampled and provided to the respective aggregation node for aggregation into a flow record; and
   a root node from the plurality of nodes, the root node representing aggregation of the set of flow records and connected to the set of aggregation nodes by a respective set of second edges from the plurality of edges, each second edge representing a threshold sampling operation characterized by a second-level generalized sampling threshold equal to a record size used to determine whether a second weight is to be provided to the root node with (i) probability proportional to a size of the second weight or (ii) probability equal to one, wherein the first selected generalized sampling threshold is equal to a maximum of the first-level generalized sampling threshold and the second-level generalized sampling threshold.

9. A method as defined in claim 1 wherein the hierarchical sampling topology is representative of sample-and-hold sampling of flow records, and wherein the hierarchical sampling topology comprises:
   a plurality of source nodes from the plurality of nodes, the plurality of source nodes characterized by a respective plurality of first weights representative of packets associated with a network flow;
   a set of aggregation nodes from the plurality of nodes, the set of aggregation nodes representing a flow record aggregation operation, each aggregation node connected to a respective source node by a respective first edge from the plurality of edges, each first edge representing a sampling operation characterized by a sampling probability equal to one and a respective first-level generalized sampling threshold equal to a respective packet size of a respective first weight characterizing a respective source node connected to the first edge; and
   a set of second edges from the plurality of edges, the set of second edges connecting at least some of the set of aggregation nodes and connecting one aggregation node with a root node from the plurality of nodes, each second edge representing a threshold sampling operation characterized by a second-level generalized threshold based on a packet size of a respective first weight characterizing a respective source node connected to a respective origination node of the second edge, wherein the selected generalized sampling threshold is equal to a maximum of all second-level generalized sampling thresholds.

10. A method as defined in claim 1 wherein the hierarchical sampling topology is representative of flow slicing of flow records, and wherein the hierarchical sampling topology comprises:
   a plurality of source nodes from the plurality of nodes, the plurality of source nodes representative of packets associated with a network flow;
   a set of aggregation nodes from the plurality of nodes, the set of aggregation nodes representing a flow record aggregation operation, each aggregation node connected to a respective source node by a respective first edge from the plurality of edges, each first edge representing a uniform sampling operation characterized by a first sampling probability;
   a set of second edges from the plurality of edges, the set of second edges connecting at least some of the set of aggregation nodes, each second edge representing a sample-and-hold sampling operation characterized by a second sampling probability; and
   a root node from the plurality of nodes, the root node connected to a highest level aggregation node by a third edge, the third edge representing a threshold sampling operation characterized by a multidimensional threshold comprising a first threshold value corresponding to sampling based on a number of bytes and a second threshold value corresponding to sampling based on a number of packets, wherein the selected generalized sampling threshold is a multidimensional generalized sampling threshold having at least one generalized sampling threshold value equal to a maximum of (i) a first function parameterized by the first and second sampling probabilities and (ii) a second function parameterized by the first and second threshold values.

11. A method as defined in claim 1 wherein the selected generalized sampling threshold is a first generalized sampling threshold, and each generalized sampling threshold is a multidimensional generalized sampling threshold comprising a plurality of generalized sampling threshold values, each generalized sampling threshold value corresponding to a different characteristic of network traffic data being sampled, and further comprising:
   selecting a first generalized sampling threshold value corresponding to the first generalized sampling threshold from the set of generalized sampling thresholds when the network traffic estimate is based on a first characteristic of the network traffic data;
   selecting a second generalized sampling threshold value corresponding to a second first generalized sampling threshold from the set of generalized sampling thresholds when the network traffic estimate is based on a second characteristic of the network traffic data;

transforming the measured sample of network traffic into the confidence interval using the first generalized sampling threshold and the error parameter when the network traffic estimate is based on the first characteristic of the network traffic data; and transforming the measured sample of network traffic into the confidence interval using the second generalized sampling threshold and the error parameter when the network traffic estimate is based on the second characteristic of the network traffic data.

12. A method as defined in claim 1 further comprising:
storing data representing the confidence interval in a computer memory; and
presenting the confidence interval via a user interface.

13. A method as defined in claim 1 wherein the method is to be implemented by test equipment performing network traffic monitoring.

14. A tangible article of manufacture excluding propagating signals and storing machine readable instructions which, when executed, cause a machine to at least:
determine a hierarchical sampling topology representative of multiple data sampling and aggregation stages, the hierarchical sampling topology comprising a plurality of nodes connected by a plurality of edges, each node corresponding to at least one of a data source and a data aggregation operation, and each edge corresponding to a respective data sampling operation characterized by a respective generalized sampling threshold determined from a respective sampling probability function also characterizing the respective data sampling operation;
select one of the generalized sampling thresholds to obtain a selected generalized sampling threshold, the selected generalized sampling threshold being selected from a set of the generalized sampling thresholds associated with a respective set of the edges originating at a respective set of the nodes, the set of the nodes being a set of descendent nodes of a target node undergoing network traffic estimation; and
transform a measured sample of network traffic associated with the target node into a confidence interval for a network traffic estimate associated with the target node using the selected generalized sampling threshold and an error parameter.

15. A tangible article of manufacture excluding propagating signals as defined in claim 14 wherein the machine readable instructions, when executed, further cause the machine to:
select the selected generalized sampling threshold to be a maximum generalized sampling threshold from the set of the generalized sampling thresholds, the selection being independent of any data aggregation operation associated with any node in the hierarchical sampling topology; and
determine at least two roots of an expression parameterized by the measured sample of network traffic, the selected generalized sampling threshold and the error parameter to transform the measured sample of network traffic into the confidence interval.

16. A network traffic estimation device to determine a confidence interval characterizing a network traffic estimate, the network traffic estimation device comprising:
a sampling topology configuration unit to determine a hierarchical sampling topology representative of multiple data sampling and aggregation stages, the hierarchical sampling topology comprising a plurality of nodes connected by a plurality of edges, each node corresponding to at least one of a data source and a data aggregation operation, and each edge corresponding to a respective data sampling operation characterized by a respective generalized sampling threshold determined from a respective sampling probability function also characterizing the respective data sampling operation;
a measurement sampler to sample network traffic at a particular network location represented by a target node from the plurality of nodes in the hierarchical sampling topology; and
a confidence interval estimator to transform a measured sample of network traffic into a confidence interval for a network traffic estimate associated with the particular network location using an error parameter and a selected generalized sampling thresholds selected from a set of the generalized sampling thresholds associated with a respective set of the edges originating at a respective set of the nodes, the set of the nodes being a set of descendent nodes of the target node.

17. A network traffic estimation device as defined in claim 16 further comprising a generalized sampling threshold identifier to select a maximum generalized sampling threshold from the set of the generalized sampling thresholds associated with the respective set of the edges originating at the respective set of the descendent nodes of the target node to be the selected generalized sampling threshold, the selection to be performed independently of any data aggregation operation associated with any node in the hierarchical sampling topology.

18. A network traffic estimation device as defined in claim 16 wherein the sampling probability function characterizing each data sampling operation corresponding to each edge represents probabilities of weights representative of data associated with an origination node connected to the edge being sampled by the data sampling operation, each sampling probability function mapping possible weight values to sampling probability values from zero to one, and wherein the network traffic estimation device further comprises a generalized threshold sampling conversion unit to determining a particular generalized sampling threshold to characterize a particular data sampling operation corresponding to a particular one of the edges connected to a particular one of the nodes to be a maximum value of a ratio of possible weight values to corresponding sampling probability values for those possible weight values associated with the particular node having sampling probability values strictly less than one.

19. A network traffic estimation device as defined in claim 16 wherein the confidence interval estimator is to transform the measured sample of network traffic into the confidence interval by determining at least two roots of an expression parameterized by the measured sample of network traffic, the selected generalized sampling threshold and the error parameter.

20. A network traffic estimation device as defined in claim 16 further comprising:
a parameter configuration unit to obtain the error parameter and to specify the target node representative of the particular network location for which the confidence interval for the network traffic estimate is to be determined; and
a presentation interface to present at least one of the confidence interval and an accuracy of the confidence interval via a user interface.

* * * * *